US012751509B2

(12) United States Patent
Hullegie

(10) Patent No.: US 12,751,509 B2
(45) Date of Patent: Oct. 6, 2026

(54) WEARABLE ARTICLE AND METHOD OF MANUFACTURING A WEARABLE ARTICLE

(71) Applicant: Converse Inc., Boston, MA (US)

(72) Inventor: Eric Hullegie, Boston, MA (US)

(73) Assignee: NIKE, Inc., Beaverton, OR (US)

( * ) Notice: Subject to any disclaimer, the term of this patent is extended or adjusted under 35 U.S.C. 154(b) by 23 days.

(21) Appl. No.: 18/917,650

(22) Filed: Oct. 16, 2024

(65) Prior Publication Data

US 2025/0031789 A1 Jan. 30, 2025

Related U.S. Application Data

(60) Continuation of application No. 17/590,000, filed on Feb. 1, 2022, now Pat. No. 12,144,398, which is a (Continued)

(51) Int. Cl.
*A45F 3/04* (2006.01)
*A41D 27/20* (2006.01)
(Continued)

(52) U.S. Cl.
CPC .............. *A41D 27/205* (2013.01); *A43B 1/14* (2013.01); *A43B 3/38* (2022.01); *A43C 19/00* (2013.01); *A44B 11/20* (2013.01); *A45C 13/1084* (2013.01); *A45F 3/04* (2013.01); *B29C 51/14* (2013.01); *A45F 2003/045* (2013.01); *B29C 2793/0081* (2013.01)

(58) Field of Classification Search
CPC ............ A45F 3/04; A45F 3/042; A45F 3/047; A45F 3/06; A45F 3/08; A45F 2003/045; B29C 51/14; B29C 51/145; B29C 2793/0081; A45C 13/1076; A45C 13/1084; A45C 2013/1007; A41D 27/205; A43B 3/38; A43B 1/14; A43C 19/00; A44B 11/20; Y10T 24/3401
USPC .................................... 224/627–659; 24/307
See application file for complete search history.

(56) References Cited

U.S. PATENT DOCUMENTS

| | | | | |
|---|---|---|---|---|
| 3,790,439 A * | 2/1974 | La Perre | C09J 7/35 283/64 |
| 4,041,203 A * | 8/1977 | Brock | B32B 5/08 206/439 |
| 5,658,511 A | 8/1997 | Nicolay | |
| 8,850,719 B2 * | 10/2014 | Hawkinson | B32B 5/26 36/45 |
| 2001/0008683 A1 * | 7/2001 | Takai | D04H 1/558 428/196 |

(Continued)

FOREIGN PATENT DOCUMENTS

| | | |
|---|---|---|
| CN | 1642707 A | 7/2005 |
| CN | 101181833 A | 5/2008 |
| CN | 101443180 A | 5/2009 |
| CN | 103347933 A | 10/2013 |

(Continued)

*Primary Examiner* — Scott T McNurlen
(74) *Attorney, Agent, or Firm* — Quinn IP Law

(57) ABSTRACT

In an example, a wearable article includes a nonwoven textile sheet having a first portion and a second portion contiguous with the first portion. The first portion has a first density and a first modulus of elasticity. The second portion has a second density less than the first density and has a second modulus of elasticity less than the first modulus of elasticity. The first portion is shaped differently than the second portion as an integral implement of the wearable article. A method of manufacturing a wearable article may comprise thermoforming the first portion while the second portion contiguous with the thermoformed first portion is not thermoformed.

15 Claims, 14 Drawing Sheets

Related U.S. Application Data division of application No. 16/691,767, filed on Nov. 22, 2019, now Pat. No. 11,497,270.

(60) Provisional application No. 62/789,132, filed on Jan. 7, 2019.

(51) Int. Cl.

| | |
|---|---|
| ***A43B 1/14*** | (2006.01) |
| ***A43B 3/38*** | (2022.01) |
| ***A43C 19/00*** | (2006.01) |
| ***A44B 11/20*** | (2006.01) |
| ***A45C 13/10*** | (2006.01) |
| ***B29C 51/14*** | (2006.01) |

(56) References Cited

U.S. PATENT DOCUMENTS

| | | | | |
|---|---|---|---|---|
| 2010/0199406 | A1* | 8/2010 | Dua | B29C 66/723 2/243.1 |
| 2011/0180959 | A1* | 7/2011 | Donnelly | B29C 66/436 264/241 |
| 2011/0250384 | A1 | 10/2011 | Sumi et al. | |
| 2017/0202184 | A1* | 7/2017 | Moore | A01K 27/003 |
| 2018/0098584 | A1* | 4/2018 | Pezzimenti | A41D 27/28 |

FOREIGN PATENT DOCUMENTS

| | | | |
|---|---|---|---|
| CN | 104739558 | A | 7/2015 |
| CN | 105690893 | A | 6/2016 |
| EP | 3213903 | A1 | 9/2017 |
| GB | 1052727 | | 12/1966 |

* cited by examiner

WEARABLE ARTICLE AND METHOD OF MANUFACTURING A WEARABLE ARTICLE

CROSS-REFERENCE TO RELATED APPLICATION

This application is a continuation of U.S. Nonprovisional application Ser. No. 17/590,000, filed Feb. 1, 2022, which is a divisional of U.S. Nonprovisional application Ser. No. 16/691,767, filed Nov. 22, 2019, now U.S. Pat. No. 11,497, 270, issued Nov. 15, 2022, which claims the benefit of priority to U.S. Provisional Application No. 62/789,132, filed Jan. 7, 2019, and each of which is hereby incorporated by reference in its entirety.

TECHNICAL FIELD

The present disclosure generally relates to a wearable article with a nonwoven textile sheet having an integral portion shaped as an integral implement of the wearable article, and a method of manufacturing the wearable article.

BACKGROUND

Wearable articles such as carry bags, belts, and other apparel should provide sufficient comfort while also being of a durable nature in order to repeatedly and reliably perform functions such as support and closure.

BRIEF DESCRIPTION OF THE DRAWINGS

The drawings described herein are for illustrative purposes only, are schematic in nature, and are intended to be exemplary rather than to limit the scope of the disclosure.

DESCRIPTION

Figure 1:
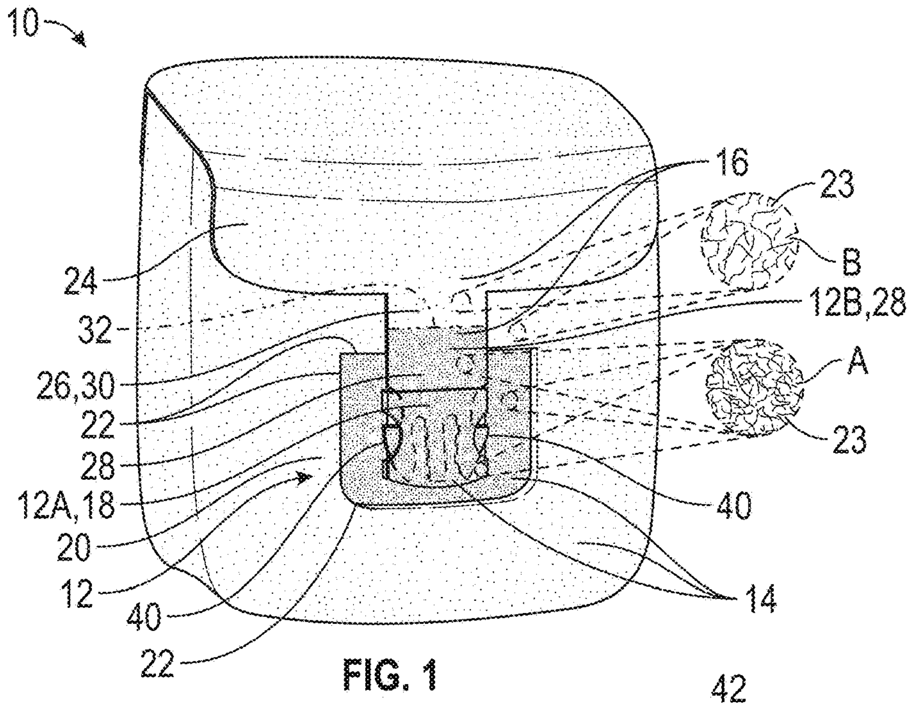
FIG. 1 is a perspective view of a wearable article including a closure device having a male portion releasably secured to a female portion to close the wearable article.

The present disclosure generally relates to wearable articles and their manufacture. Wearable articles including nonwoven textile sheets with integral portions shaped as integral implements are disclosed. A method of manufacturing the nonwoven textile sheet provides an integral portion of the sheet with a shape and a sufficiently high modulus of elasticity enabling it to serve as an integral implement, while a contiguous portion of the sheet maintains a lower modulus of elasticity for comfort, aesthetic appearance, or both. The wearable articles disclosed herein are reduced in complexity in comparison to wearable articles in which separate (e.g., non-integral) structural components of different materials are secured to a textile sheet to serve the same functions as the integral implements. Additionally, the nonwoven textile sheet may be formed from recycled materials.

In an example, a wearable article may comprise a nonwoven textile sheet having a first portion shaped as an integral implement of the wearable article. The nonwoven textile sheet may also have a second portion contiguous with the first portion. The first portion may have a first density and a first modulus of elasticity. The second portion may have a second density less than the first density and a second modulus of elasticity less than the first modulus of elasticity. For example, the moduli of elasticity may be tensile moduli (Young's modulus). The first portion is shaped differently than the second portion, and its shape, density, and modulus of elasticity enables it to function as an integral implement of the wearable article.

As used herein, for the purposes of this application and its claims, a "wearable article" is an article that is configured to be worn on a human body, and does not include durable goods not intended to be worn on a human body, such as furniture and automotive upholstery. Non-limiting examples of wearable articles include footwear, apparel, carry bags such as backpacks, purses, duffel bags, fanny packs, and other types of portable containment structures intended to be worn on a human body. As used herein, for the purposes of this application and its claims, a "carry bag" is a containment device having one or more straps or handles or other features configured for placement on a human body, and includes but is not limited to backpacks, purses, duffle bags, and fanny packs.

As used herein, for the purposes of this application and its claims, an "integral implement" is a portion of a nonwoven textile sheet that is of unitary construction with a contiguous portion of the sheet, and that has a function that is at least partly accomplished by its shape, including its contours, and by its sufficient rigidity to accomplish the function, as indicated by its modulus of elasticity. Examples of integral implements as defined herein include closure devices, such as buckles, including male portions of buckles and female portions of buckles, snaps, buttons, and other types of closure devices, and receptacles, such as for power sources or power devices, including batteries, lights, cellular phones, etc. Other examples of integral implements include footwear heel counters.

The first portion and the second portion of the nonwoven textile sheet may originally be of the same density and modulus of elasticity. The first portion may be thermoformed, for example, heating and compressing its fibers together to increase its density and modulus of elasticity so that it can function as an integral implement, whereas the less stiff, less dense second portion does not have the function of the integral implement, but is useful for serving other purposes, such as functions that require more flexibility. The fibers of the different layers may melt together when heated and pressed during thermoforming, as discussed herein, which may make the boundaries of the different layers less distinct. Heating of the first portion of the nonwoven textile sheet may be via heated thermoforming mold tools. Alternatively or in addition, at least the first portion of the nonwoven textile sheet may be heated prior to placing the first portion in the thermoforming mold. In some configurations, the thermoforming mold may be cooled to help maintain the exterior surface of the nonwoven textile sheet below a predetermined temperature in order to prevent some or all of the melt fibers at the exterior surface of the first portion from melting during thermoforming.

The relative thicknesses of the first portion and the second portion may be different in different configurations. For example, a thickness of the first portion may be within a range from about 10 percent less than to about 10 percent greater than a thickness of the second portion, or within a range from about 5 percent less than to about 5 percent greater than the thickness of the second portion, or within a range from about 1 percent less than to about 1 percent greater than the thickness of the second portion. Alternatively, a thickness of the first portion may be more than 10 percent greater than a thickness of the second portion, or a thickness of the second portion may be more than 10 percent greater than a thickness of the first portion.

In an aspect, the first portion may define a through hole extending through the nonwoven textile sheet. For example, one or more laser cut or punched through holes may be made in the first portion. In embodiments in which the wearable article includes a closure device, the through hole may be an opening in a female portion of the closure device at which a male portion of the closure device releasably secures.

In another aspect, the wearable article may include a textile component, which may be a textile sheet, and the nonwoven textile sheet may be secured to the textile component. For example, the nonwoven textile sheet may be secured to the textile component such as by sewing or bonding. In other embodiments in which the wearable article includes a textile component, fibers of the second portion of the nonwoven textile sheet may be intertwined with fibers of the textile component to secure the second portion to the textile component, such as by needle punching. In such embodiments, the textile component may underlie both the first portion and the second portion. In one or more implementations, the integral implement of the first portion of the nonwoven textile panel may be one of either a female portion or a male portion of a closure device. For example, the wearable article may be a carry bag or a belt, and the closure device may be a buckle. In implementations where the wearable article is a carry bag, the integral implement may be a male portion of the buckle or a female portion of the buckle. For example, the carry bag may include a flap and a base. The male portion of the buckle may be disposed on a strap extending from the flap to a female portion of the buckle disposed on the base, or on a strap extending from the base to a female portion of the buckle disposed on the flap. The male portion of the buckle may be disposed at the flap or at the strap, such as at an end of the strap.

In an example in which the wearable article is a carry bag and the integral implement is a male portion of the buckle, the carry bag may include an additional nonwoven textile sheet with a first portion shaped as an integral implement that may be a female portion of the buckle, and with a second portion contiguous with the first portion. The female portion of the buckle may be an additional integral implement of the carry bag. The first portion of the additional nonwoven textile sheet may have a density greater than a density of the second portion of the additional nonwoven textile sheet and a modulus of elasticity greater than a modulus of elasticity of the second portion of the additional nonwoven textile sheet. The male portion may be shaped and dimensioned to releasably secure to the female portion.

In some embodiments, the closure device may be a buckle for sternum straps of a backpack, or a waist belt for a backpack.

In other implementations, the wearable article may be footwear, and the integral implement may be a heel counter. The wearable article is not limited to carry bags and articles of footwear, however, and the integral implement is not limited to closure devices and heel counters. For example, the wearable article could be a carry bag, an article of footwear, or an article of apparel, and the integral implement may be a receptacle for a power source or a power device, such as a battery, a light, a cellular phone, etc.

In one or more implementations, the first portion may comprise multiple stacked nonwoven textile layers, which may include a first outer layer, a second outer layer and at least one intermediate layer disposed between the first outer layer and the second outer layer. The at least one intermediate layer may extend only in the first portion.

In an aspect, an edge of the at least one intermediate layer may be tapered. The edge that is tapered may be adjacent to the second portion.

In an example, a carry bag may comprise a nonwoven textile sheet having a first portion shaped as an integral implement that is a portion of a buckle, the nonwoven textile sheet having a second portion contiguous with the first portion. The first portion may have a density greater than a density of the second portion and a modulus of elasticity greater than a modulus of elasticity of the second portion. The first portion of the buckle may be a female portion of a buckle, and the carry bag may further comprise a nonwoven textile strap having a first portion shaped as an integral implement that is as a male portion of the buckle that releasably secures to the female portion. The nonwoven textile strap may have a second portion contiguous with the first portion of the nonwoven textile strap. The first portion of the nonwoven textile strap may have a density greater than a density of the second portion of the nonwoven textile strap and a modulus of elasticity greater than a modulus of elasticity of the second portion of the nonwoven textile strap.

In an example, a method of manufacturing a wearable article, such as those disclosed herein, may comprise thermoforming a first portion of a nonwoven textile sheet as an integral implement of the wearable article. The nonwoven textile sheet may have an unthermoformed second portion contiguous with the thermoformed first portion and shaped differently than the first portion. The first portion may have a first density and a first modulus of elasticity after thermoforming. The unthermoformed second portion may have a second density less than the first density and a second modulus of elasticity less than the first modulus of elasticity.

In one or more configurations, the method may include, prior to thermoforming in the thermoforming mold, heating at least the first portion of the nonwoven textile sheet. After heating at least the first portion of the nonwoven textile sheet, the method may include placing the first portion of the nonwoven textile sheet in the thermoforming mold. A temperature of a mold surface of the thermoforming mold may be less than a temperature of the first portion of the nonwoven textile sheet. For example, the mold surface may be at room temperature, or may be actively cooled to a temperature less than or equal to room temperature during the thermoforming process. A temperature differential between the portion of the nonwoven textile sheet being thermoformed and the mold surfaces may help to retain the original texture of the exterior surface of the nonwoven textile sheet, such as a relatively rough (e.g., hairy) texture of felt, even though the sheet is compressed during thermoforming.

In one or more implementations, the method may further comprise, prior to thermoforming the first portion, stacking multiple nonwoven textile layers to define the first portion. The multiple nonwoven textile layers may include a first outer layer, a second outer layer, and at least one intermediate layer disposed between the first outer layer and the second outer layer. The at least one intermediate layer may extend only in the first portion. The first outer layer and the second outer layer may extend in both the first portion and the second portion. For example, the first outer layer and the second outer layer may be two separate nonwoven textile sheets. In other embodiments, a single nonwoven textile sheet forms the first portion and the second portion, with only the first portion split to create the first outer layer and second outer layer. For example, the method may include, prior to stacking the multiple nonwoven textile layers, splitting the nonwoven textile sheet only at the first portion to define the first outer layer and the second outer layer, the first outer layer and the second outer layer extending only in the first portion. The method may further comprise inserting the at least one intermediate layer in the split between the first outer layer and the second outer layer.

In one or more configurations, the method may further comprise, prior to inserting the at least one intermediate layer between the first outer layer and the second outer layer, tapering an edge of the at least one intermediate layer. Inserting the at least one intermediate layer between the first outer layer and the second outer layer may be with the tapered edge adjacent the second portion. In an aspect, the method may further comprise, after stacking the multiple nonwoven textile layers and before thermoforming the first portion, heat pressing the multiple nonwoven textile layers to one another.

In one or more implementations, the method may further comprise creating at least one through hole in the first portion extending through the nonwoven textile sheet. For example, creating at least one through hole in the first portion may comprise laser cutting the at least one through hole or punching the at least one through hole.

In one or more implementations, the method may further comprise, after thermoforming the first portion, trimming a peripheral edge of the first portion. For example, trimming the peripheral edge of the first portion may be by laser cutting. In embodiments in which the structural component is a male portion of a buckle, trimming the peripheral edge may be to define prongs of the buckle, for example.

In one or more configurations, the wearable article may include a textile component, and the method may further comprise, after thermoforming the first portion, securing the nonwoven textile sheet to the textile component so that the nonwoven textile sheet extends from the textile component. For example, the nonwoven textile sheet may be a flap of a carry bag secured at a peripheral edge to a textile component of the carry bag. In one or more other configurations in which the wearable article includes a textile component, the method may further comprise, after thermoforming the first portion, needle punching the second portion to the textile component. For example, after needle punching the second portion to the textile component, the nonwoven textile sheet may be adjacent to a surface of the textile component with the first portion and the second portion both overlaying the textile component at the surface, and with at least the second portion in contact with the surface. For example, where the integral implement is a female portion of the buckle for a carry bag or is a receptacle for a power source or power device, the first portion and second portion may overlay the textile component. Any through holes in the female portion are then blocked from an interior cavity of the carry bag by the textile component.

The above features and advantages and other features and advantages of the present teachings are readily apparent from the following detailed description of the modes for carrying out the present teachings when taken in connection with the accompanying drawings.

Referring to the drawings, FIG. 1 shows a wearable article 10 configured and manufactured according to the teachings herein. In FIG. 1, the wearable article 10 is a carry bag, such as a purse or a backpack, and may be referred to herein as such. The wearable article 10 includes a closure device 12, discussed in further detail herein. The closure device 12 is shown as a buckle, and may be referred to as such herein. The closure device may be included in other wearable articles within the scope of the present teachings, such as belts. Shoulder straps of the wearable article 10 are not shown, but may be on the back side of the wearable article.

The wearable article 10 includes one or more nonwoven textile sheets, such as nonwoven textile sheets 14 and 16. The nonwoven textile sheets 14, 16 may be a felt material having relatively short and randomly disposed fibers 23. The felt material may include plastic, such as a polyester, including but not limited to a thermoplastic polymer such as polyethylene terephthalate (PET), and may be made from recycled plastic. For example, the fibers 23 may be PET. One advantage of felt is that it is suitably soft for use as a wearable article, and is available in sheet form, which can be manufactured according to the method disclosed herein. The random distribution of fibers 23 matted together in a nonwoven textile sheet, as opposed to an ordered distribution that occurs in a woven material, enables the sheets 14, 16 to be shaped and formed as described herein without the felt providing resistive forces tending to pull the sheet back to its original flat shape, as could occur with a material having woven strands. As described herein, portions of one or both of the nonwoven textile sheets 14, 16 may be formed to achieve a nonplanar shape that can function as integral implements of the nonwoven textile sheet, while a contiguous remaining portion of the sheet may remain planar or at least may have a different shape than the first portion.

The nonwoven textile sheet 14 is configured as a base of the carry bag 10, and may be referred to as such. The nonwoven textile sheet 14 has a first portion 18 shaped and dimensioned as an integral implement of the wearable article 10. The first portion 18 is a female portion 12A of the closure device 12. The nonwoven textile sheet 14 also has a second portion 20 contiguous with the first portion 18 at an outer boundary 22 of the first portion 18. As discussed herein, the first portion 18 is molded by thermoforming to achieve the shape different than the second portion 20, whereas the surrounding second portion 20 is not thermoformed. The first portion 18 of the nonwoven textile sheet 14 is that portion inward of the outer boundary 22. Accordingly, prior to thermoforming the first portion 18, the first portion 18 and the second portion 20 have the same density and modulus of elasticity and the same relatively flat, planar shape. The thermoforming compresses the first portion 18 relative to the second portion 20, causing the PET fibers 23 of the first portion 18 (illustrated in close-up circle A) to establish and maintain a more compacted arrangement relative to the PET fibers 23 of the second portion 20 (illustrated in close-up circle B). The heat and pressure may melt the fibers, allowing the PET material to flow and form to the shape of the mold. Different percentages of melt fibers versus non-melt fibers will result in different levels of hardness, rigidity, and strength of the thermoformed first portion 18.

For example, the melt fibers included in the PET fibers 23 may melt in a temperature range from 110 degrees Celsius to 140 degrees Celsius, with the molding process lasting between about 30 seconds and two minutes. The longer the molding process (e.g., the longer the nonwoven textile sheet 14 is held in the thermoforming mold and/or the longer pressure is maintained on the nonwoven textile sheet 14 in the mold, the greater percentage of melt fibers that melt, and the greater the resulting compression). The higher the temperature, the greater percentage of the melt fibers that will melt, and the greater the resulting compression. With more melt fibers melting, the exterior surface of the first portion 18 may become relatively smooth, losing its original relatively rough (e.g., hairy) texture caused by the randomly distributed fibers 23. If it is desired to maintain more of the original texture at the exterior surface, then, instead of heating the mold tools, the nonwoven textile sheet 14 can be pre-heated in an oven to a temperature sufficient to cause melting of the melt fibers, but at the low end of the melt temperature range. The mold tools may then be at room temperature, or even cooled below room temperature. Contact of the mold tools with the nonwoven textile sheet 14 will then cool the exterior surface of the nonwoven textile sheet 14 relative to its pre-heated temperature, leaving the original texture largely intact. Example pressures that may be used to compress the nonwoven textile sheet 14 during thermoforming may be from about 40 pounds per square inch (psi) to about 100 psi. At higher pressures, the resulting compression will be greater, with a corresponding increase in hardness, rigidity, and strength.

In the finished carry bag 10, the thermoformed first portion 18 has a first density and a first modulus of elasticity, while the second portion 20 has a second density less than the first density and a second modulus of elasticity less than the first modulus of elasticity, such as a tensile modulus (Young's modulus) that is less than that of the first portion 18. Additionally, the thermoforming imparts a shape to the first portion 18 that enables it to function as an integral implement of the nonwoven textile sheet 14.

The nonwoven textile sheet 16 also includes a first portion 28 shaped and dimensioned as an integral implement that is a male portion 12B of the buckle 12 that releasably secures to the female portion 12A. In FIG. 1, the first portion 28 (male portion 12B) is shown releasably secured to the first portion 18 (female portion 12A). The nonwoven textile sheet 16 includes a flap 24 and a strap 26 extending from the flap 24. The strap 26 includes the first portion 28 and a second portion 30 contiguous with the first portion 28. The first portion 28 is disposed at an end of the strap 26. The second portion 30 is contiguous with the first portion 28 at a boundary 32 and extends to or includes the flap 24. When the male portion 12B is secured to the female portion 12A, the buckle 12 is buckled and the carry bag 10 is closed. The flap 24 and strap 26 are sized to allow the flap 24 to overlay the top and part of the front of the carry bag 10, with the strap 26 extending downward toward the female portion 12A of the buckle 12. Alternatively, the strap 26 with the male portion 12B could extend from the nonwoven textile sheet 14 (e.g., from the base of the carry bag 10), and the female portion 12A could be included in the flap 24 of the nonwoven textile sheet 16.

The first portion 28 is thermoformed in a mold as described herein that compresses the fibers 23 of the first portion 28 (shown in close-up circle A) in comparison to the fibers 23 of the second portion 30 (shown in close-up circle B), which is not thermoformed. Prior to thermoforming, the first and second portions 28, 30 have the same density and modulus of elasticity. Only the first portion 28 is thermoformed, and as a result of the thermoforming, the first portion 28 has a density greater than a density of the second portion 30 and a modulus of elasticity greater than a modulus of elasticity of the second portion 30.

Figure 2:
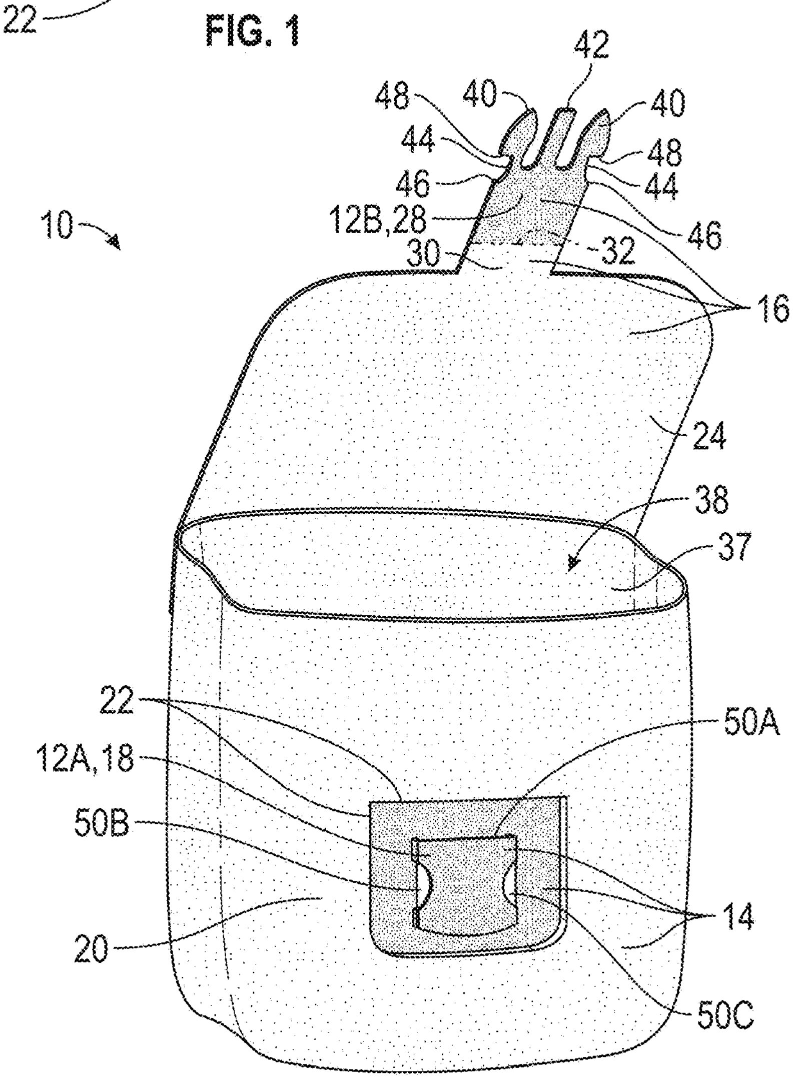
FIG. 2 is a perspective view of the wearable article of FIG. 1, with the closure device open.

In FIG. 2, the male portion 12B (first portion 28) is shown released from the female portion 12A (first portion 18) so that the buckle 12 is unbuckled and the carry bag 10 is open at opening 37, allowing access to an interior cavity 38 formed at least partially by the base of the carry bag 10 (e.g., by the nonwoven textile sheet 14). The first portion 28 includes side prongs 40 and a center prong 42. The side prongs 40 have notches 44 at their outer sides that define a first shoulder 46 and a second shoulder 48 in each of the side prongs 40. The side prongs 40 are relatively stiff. When inserted into through hole 50A of the female portion 12A, the side prongs 40 will be pressed laterally inward toward the center prong 42 and will be biased back outward toward their free orientation shown in FIG. 2, to hook to the female portion 12A at through holes 50B, 50C. Accordingly, the shape and dimension of the male portion 12B, including the side prongs 40, enable it to function as an integral implement of the nonwoven textile sheet 16 (e.g., as a male portion of the buckle 12 that can secure to the female portion 12A).

Figure 3:
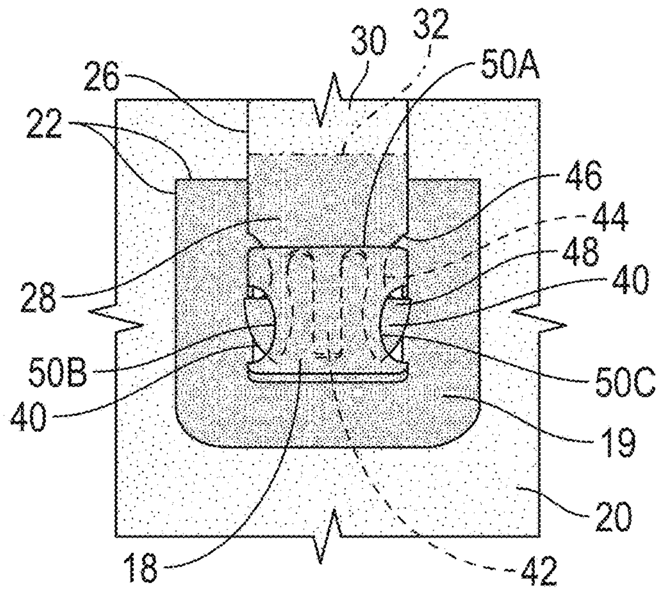
FIG. 3 is a fragmentary close-up plan view of the closure device of FIG. 1.

As best seen in FIG. 3, the first portion 18 is shaped and dimensioned as an integral implement of the wearable article 10. More specifically, due to the shape of the thermoforming mold discussed herein, the first portion 18 is nonplanar with the remainder of the sheet 14, including the second portion 20. The first portion 18 extends outward, away from the second portion 20. The first portion 18 defines three through holes 50A, 50B, 50C extending through the nonwoven textile sheet 14. For example, the through holes 50A, 50B, 50C may be laser cut or punched in the first portion 18. The through hole 50A generally opens in the same direction as the opening 37. The through holes 50B, 50C are generally orthogonal to the through hole 50A.

The male portion 12B (first portion 28) is shaped and dimensioned to releasably secure to the female portion 12A (first portion 18) by the side prongs 40 passing through the through hole 50A and latching to the first portion 18 by the second shoulders 48 catching on the first portion 18 at the through holes 50A, 50B and the first shoulders 46 abutting first portion 18 outside of the through hole 50A. When the side prongs 40 are inserted into the through hole 50A, they are pressed inward toward the center prong 42 as they contact and slide against the first portion 18 at either side of the through hole 50A. Once they make it past the through hole 50A, they release outward and the shoulders 48 are disposed more widely apart from one another than the width of the female portion 12A (first portion 18) so that the shoulders 48 catch on the first portion 18 at the through holes 50B, 50C. To release the male portion 12B (first portion 28) from the female portion 12A (first portion 18), the side prongs 40 are manually pressed laterally inward at the through holes 50B, 50C to allow the male portion 12B (first portion 28) to be withdrawn from the female portion 12A (first portion 18) at the through hole 50A. The denser and stiffer, thermoformed first portions 18, 28 allow their respective shapes to be maintained with repeated use to enable long term functioning of the buckle 12.

Figure 4:
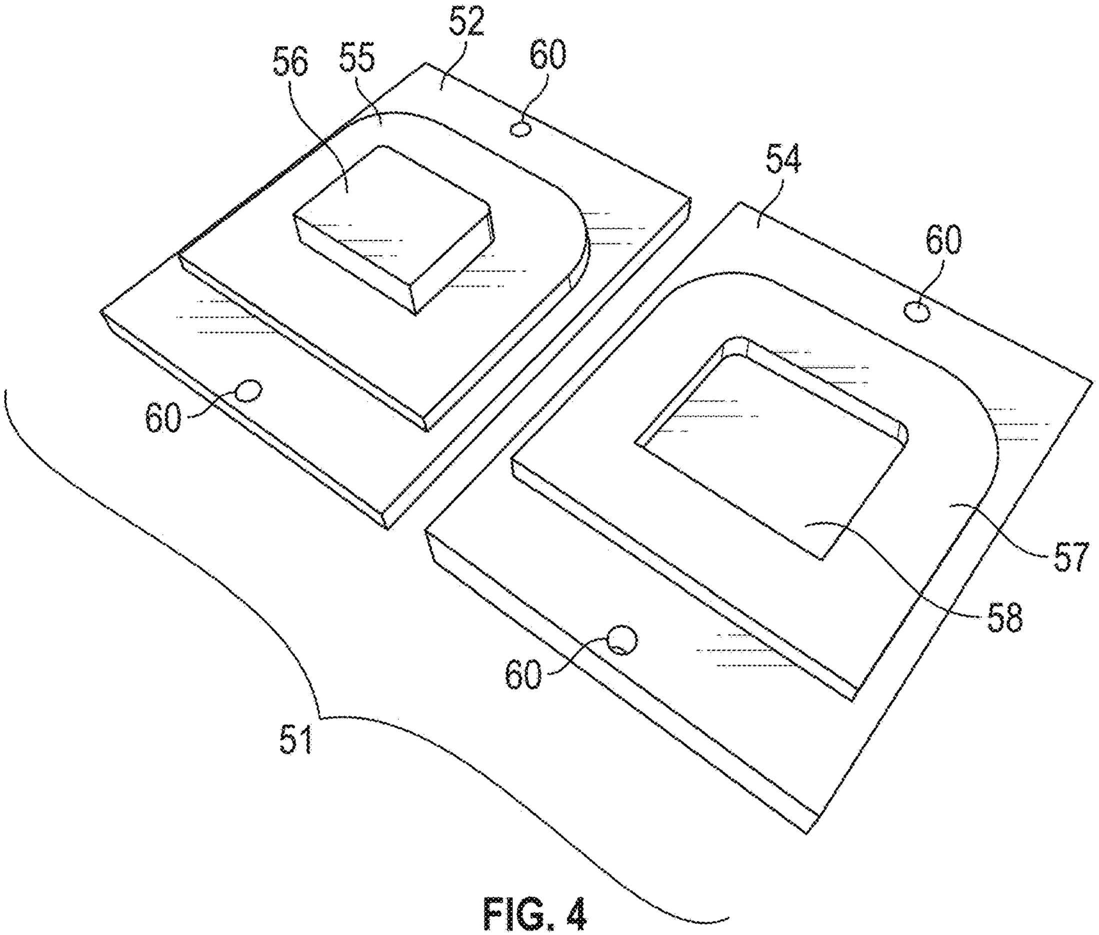
FIG. 4 is a schematic plan view of a mold for the female portion of the closure device of FIG. 1.

FIG. 4 shows two halves of a thermoforming mold 51. A male mold tool 52 and a female mold tool 54 are shown. The male mold tool 52 includes a mold face 55 and a protrusion 56 extending out of the mold face 55. The female mold tool 54 includes a mold face 57 that is the same size as the mold face 55. The female mold tool 54 includes a recess 58 in the mold face 57. The protrusion 56 of the male mold tool 52 fits within the recess 58. The female portion 12A (first portion 18) of the buckle 12 of FIG. 3 is thermoformed in the mold 51 by placing the nonwoven textile sheet 14 between the mold faces 55, 57 with locators 60 on the mold tools 52, 54 aligned with one another on pins or the like. The mold tools 52, 54 may be heated, such as by resistance heating. Alternatively, instead of heating the mold tools 52, 54, the nonwoven textile sheet 14 may be heated in an oven prior to thermoforming, and the mold tools 52, 54, or at least the mold surfaces of the mold tools 52, 54, may be at room temperature or even cooled as discussed above in order to cool the exterior surface of the nonwoven textile sheet 14 when it is placed in the mold 51 to help maintain the exterior surface texture of the resulting thermoformed first portion 18. The first portion 18 of the buckle 12 is formed where the nonwoven textile sheet 14 is captured between and contacted by the protrusion 56 and the recess 58, assuming the shape of the nonplanar first portion 18. The forces exerted on the nonwoven textile sheet 14 by the mold 51 are not resisted by any woven strands, as the felt material has only short, randomly disposed fibers 23.

Figure 5:
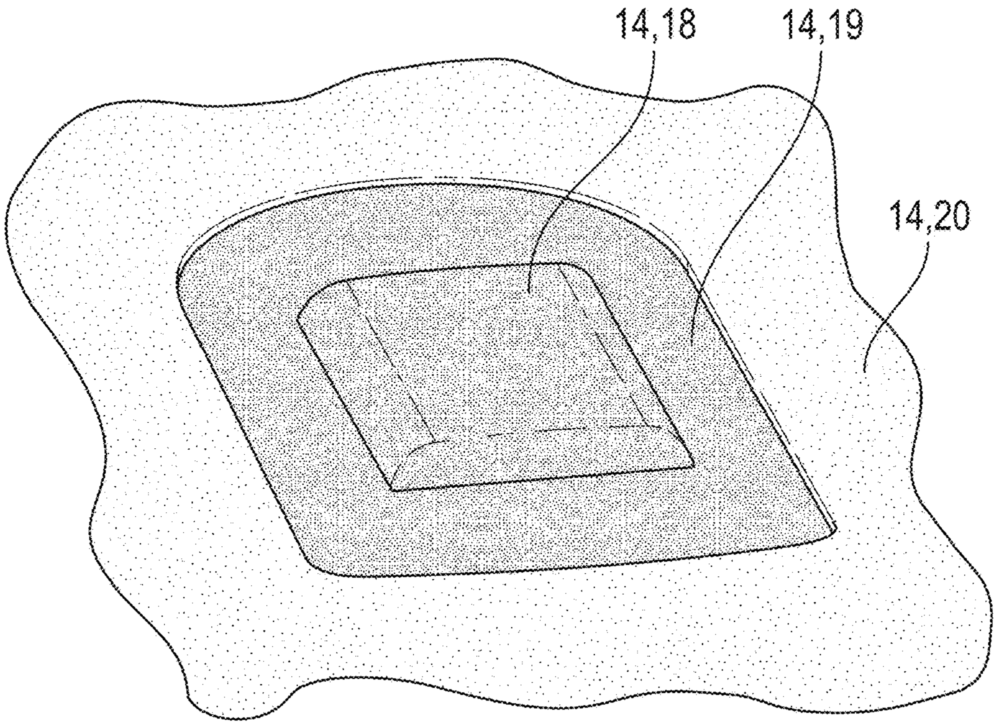
FIG. 5 is a fragmentary perspective view of a nonwoven textile sheet forming the female portion of the closure device of FIG. 1 prior to creating through holes in the sheet.

FIG. 5 shows the nonwoven textile sheet 14 with the first portion 18 and the second portion 20 after thermoforming, cooling, and removal from the mold 51. A planar thermoformed portion 19 surrounds the first portion 18 and is formed where the mold faces 55, 57 contact both sides of the nonwoven textile sheet 14. If heated, the mold 51 causes the nonwoven textile sheet 14 to heat (and/or the nonwoven textile sheet 14 is pre-heated as discussed herein), and the fibers 23 then compress together and a percentage of the fibers melt (melt fibers) and maintain the new nonplanar shape of the integral implement (female portion 12A) when cooled, with the first portion 18 extending outward from the planar thermoformed portion 19. The second portion 20 is not in sufficient contact with the mold tools 52, 54 and therefore maintains the original density and modulus of elasticity of the nonwoven textile sheet 14, whereas the density and moduli of elasticity of the portions 18, 19 increase due to the thermoforming. Stated differently, the mold 51 compresses the material of the nonwoven textile sheet 14 at the first portion 18 and the planar thermoformed portion 19, causing these portions to be thinner and denser than they were prior to thermoforming.

Figure 6:
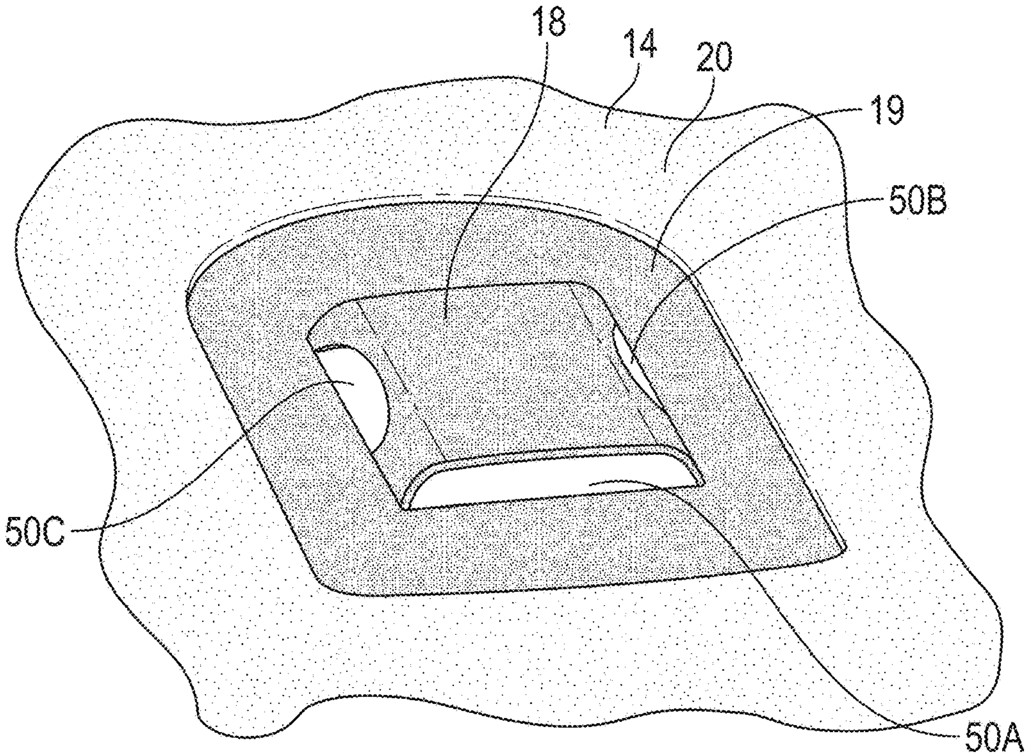
FIG. 6 is a fragmentary perspective view of the female portion of the closure device of FIG. 5 with through holes in the sheet.
Figure 7:
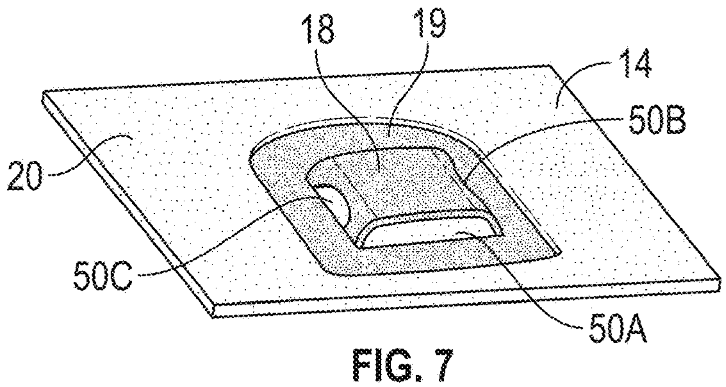
FIG. 7 is a perspective view of a nonwoven textile sheet including a female portion of a closure device.

FIG. 6 shows the nonwoven textile sheet 14 with the through holes 50A, 50B, 50C laser cut or punched through the thermoformed portion of the nonwoven textile sheet 14. In the embodiment of FIG. 1, the nonwoven textile sheet 14 is not backed by any other component at the thermoformed female portion 12A of the closure device 12. The through holes 50A, 50B, 50C therefore extend to the interior cavity 38. In some applications as described herein, it may be desirable to isolate the closure device 12 from the interior cavity 38 so that there is no access to the interior cavity 38 through the through holes 50A, 50B, 50C, thereby better sealing the interior cavity 38 from moisture and debris that could otherwise pass through the through holes 50A, 50B, 50C. FIG. 7 shows the nonwoven textile sheet 14 with the female portion 12A of the closure device 12 after thermoforming of the first portion 18 and with the planar, unthermoformed second portion 20.

Figure 8:
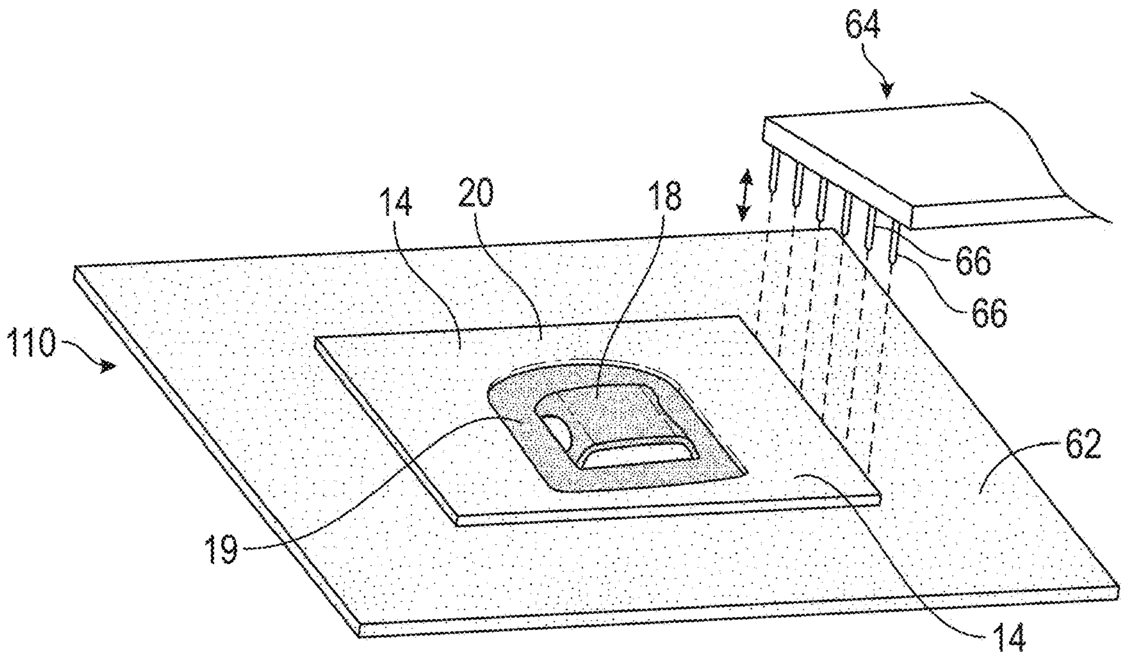
FIG. 8 is a perspective view of the sheet of FIG. 7 stacked on a textile component with a needle punch tool disposed over the sheet.

FIG. 8 shows another configuration of a wearable article 110 in which the nonwoven textile sheet 14 is stacked on a textile component 62, with the textile component 62 underlying both the first portion 18 and planar thermoformed portion 19. The textile component 62 is a planar textile sheet as shown, but may be other configurations in other embodiments. The nonwoven textile sheet 14 is secured to the textile component 62 with a needle punch 64. The needle punch 64 includes a series of needles 66 that repeatedly extend into and out of the stacked sheet 14 and textile component 62 at the unthermoformed second portion 20. Fibers of the second portion 20 are intertwined with fibers of the textile component 62 to secure the nonwoven textile sheet 14 to the textile component 62.

Figure 9:
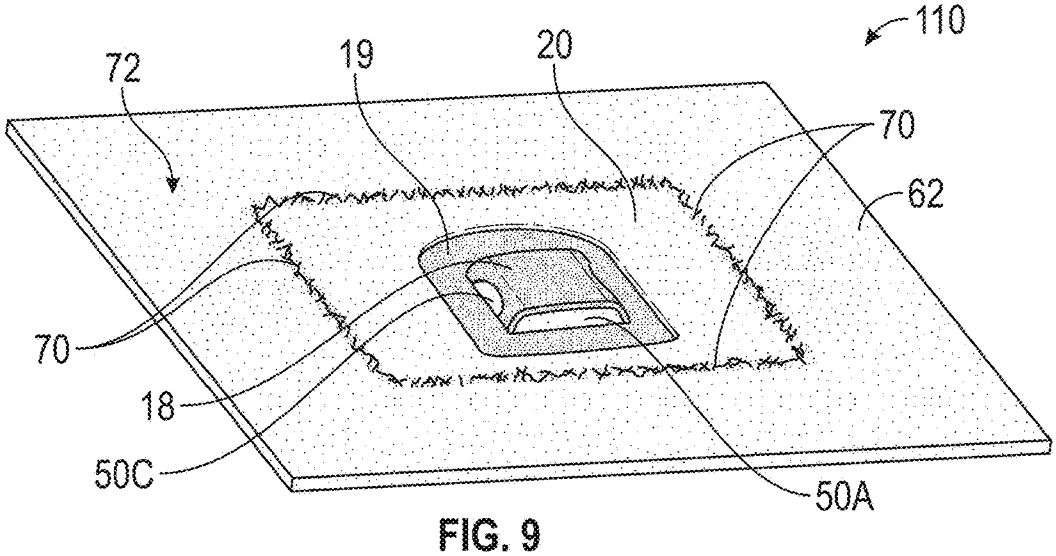
FIG. 9 is a perspective view of the sheet secured to the textile component of FIG. 8 by needle-punching.

FIG. 9 schematically shows the areas of the intertwined fibers at 70, making the perimeter of the nonwoven textile sheet 14 integrated with and at least somewhat indistinguishable from the textile component 62. The intertwined fibers 70 are exaggerated for purposes of illustration on FIG. 9, but may be visually indistinguishable from the surrounding fibers. After needle punching the second portion 20 to the textile component 62, the nonwoven textile sheet 14 is adjacent to a surface 72 of the textile component 62 with the first portion 18, the thermoformed planar portion 19, and the second portion 20 overlaying the textile component 62 at the surface 72. The second portion 20 is in contact with the surface 72 and the first portion 18 is disposed above the surface, creating a cavity between the surface 72 and the first portion 18 in which the first portion 28 of the male portion 12B of the closure device 12 is received when inserted through the through hole 50A.

Figure 10:
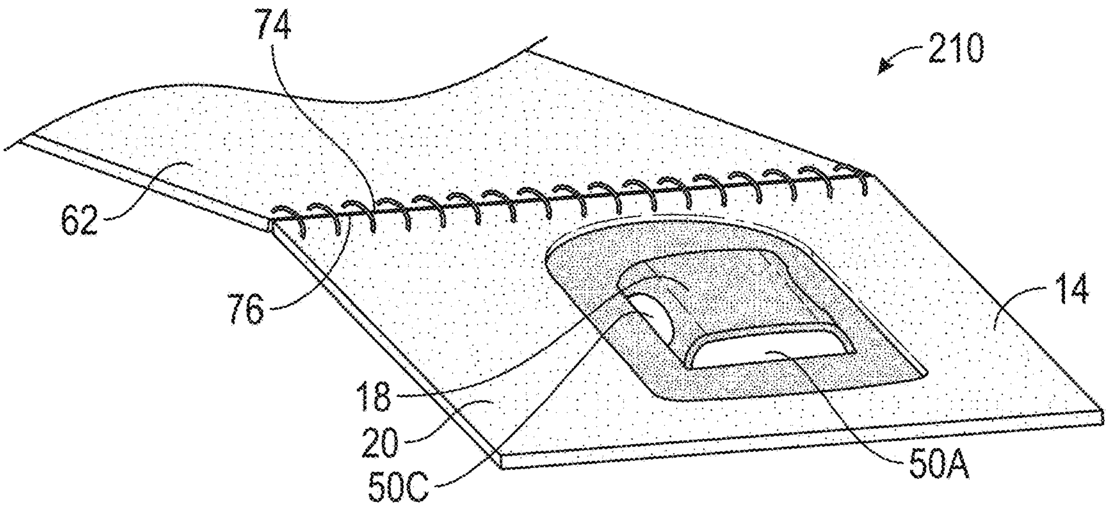
FIG. 10 is a fragmentary perspective view of a wearable article including the sheet of FIG. 8 secured at a peripheral edge to another component.

FIG. 10 shows another configuration of a wearable article 210 such as a carry bag in which an edge of the nonwoven textile sheet 14 is secured to the textile component 62 at an edge of the textile component 62 rather than over the textile component as in FIG. 9. For example, the nonwoven textile sheet 14 is secured to the textile component 62 such as by sewing or bonding an edge 74 of the nonwoven textile sheet 14 to an edge 76 of the textile component 62. In this configuration the nonwoven textile sheet 14 with the thermoformed female portion 12A of the buckle 12 is stitched to the textile component 62 so that it extends from the textile component 62. In this configuration, the nonwoven textile sheet 14 may function as a flap of a carry bag 210. The flap may extend along an exterior of the carry bag when in the closed position, rather than directly over an access opening like opening 37 of FIG. 2, so that access to the opening through the through holes 50A, 50B, 50C is not possible, and dirt or moisture passing through the through holes does not enter the opening.

Because the thermoforming process tends to compact and melt the nonwoven textile material, the thermoformed portion of a nonwoven textile sheet may be thinner than a contiguous unthermoformed portion of the sheet, and also denser and stiffer, with a greater modulus of elasticity. In some implementations, a difference in thickness may be desirable or aesthetically pleasing. In other implementations, it may be desirable that the thermoformed portion and the contiguous unthermoformed portion appear to be substantially the same thickness. Different desired combinations of thicknesses of the thermoformed portion and the unthermoformed portion can be achieved by stacking layers of nonwoven textile sheets, and/or by inserting intermediate layers of nonwoven textile or other materials between a split sheet or between layers of nonwoven textile sheets prior to thermoforming. For example, in the areas that are to be molded/thermoformed, the material thicknesses may originally be built up in order to increase wall thickness and rigidity after thermoforming. Otherwise, the thermoforming process may reduce the thickness too much, causing the resulting thermoformed portion to be unstable and fragile. In one example, a sheet or combination of stacked sheets may have an original thickness of about 28 millimeters (mm). After thermoforming the resulting thermoformed portion (e.g., first portion 28) will be compressed to a reduced thickness of about 4-5 mm.

Figure 11:
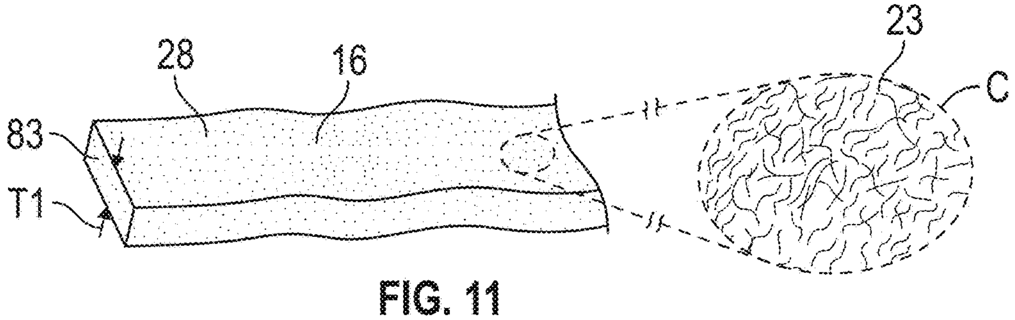
FIG. 11 is a fragmentary perspective view of a nonwoven textile sheet for the male portion of the closure device of FIG. 1 and including a close-up view of fibers of the sheet.
Figure 12:
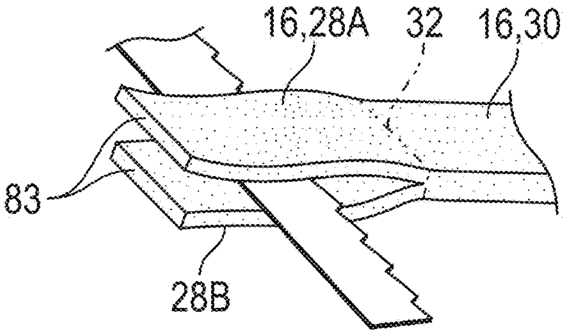
FIG. 12 is a fragmentary perspective view of the sheet of FIG. 11 during a process of splitting the sheet.
Figure 13:
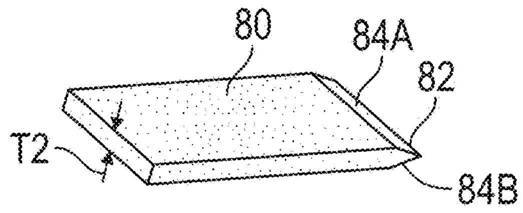
FIG. 13 is a perspective view of an insert sheet for use as an intermediate layer.

FIG. 11 shows an example of the nonwoven textile sheet 16 prior to thermoforming, having a thickness T1 and a relatively low density as evidenced by the relatively loose and randomly disposed fibers 23 in close-up circle C. FIG. 12 shows the nonwoven textile sheet 16 being split inward from a peripheral edge 83 only at and through the first portion 28 to define a first outer layer 28A and a second outer layer 28B that extend only in the first portion 28, which is not yet thermoformed. FIG. 13 shows an intermediate layer 80 that has an edge 82 that has been tapered to create an upper bevel 84A and a lower bevel 84B. The tapered edge 82 may also be referred to as a skived edge. The intermediate layer 80 has a thickness T2 prior to insertion between the layers 28A, 28B. The intermediate layer 80 may be a nonwoven textile, a woven textile, or another material. In examples in which one or more intermediate layers are used that are a different material than the outer layers of the sheet or sheets between which the intermediate layer(s) are inserted, the modulus of elasticity of a thermoformed portion formed from the stacked layers is an effective modulus of elasticity dependent upon moduli of elasticity of the individual layers and their relative thicknesses.

Figure 14:
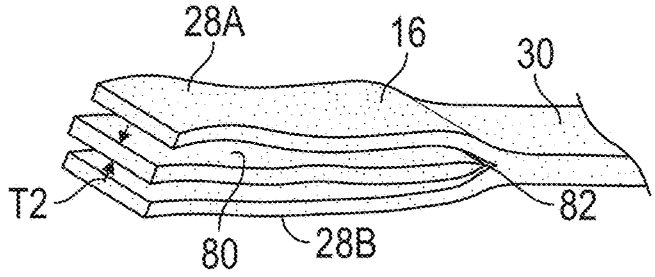
FIG. 14 is a perspective view of the split sheet of FIG. 12 with the intermediate layer of FIG. 13 inserted into the split.

FIG. 14 shows the intermediate layer 80 being inserted between the first outer layer 28A and the second outer layer 28B with the tapered edge 82 adjacent the second portion 30. The intermediate layer 80 may have a length equal to the length of the split between the outer layers 28A, 28B so that the tapered edge 82 abuts the nonwoven textile sheet 16 at the end of the split. The positioning of the tapered edge 82 of the intermediate layer 80 against the nonwoven sheet 16 at the end of the split prevents any gap from occurring after thermoforming.

Figure 15:
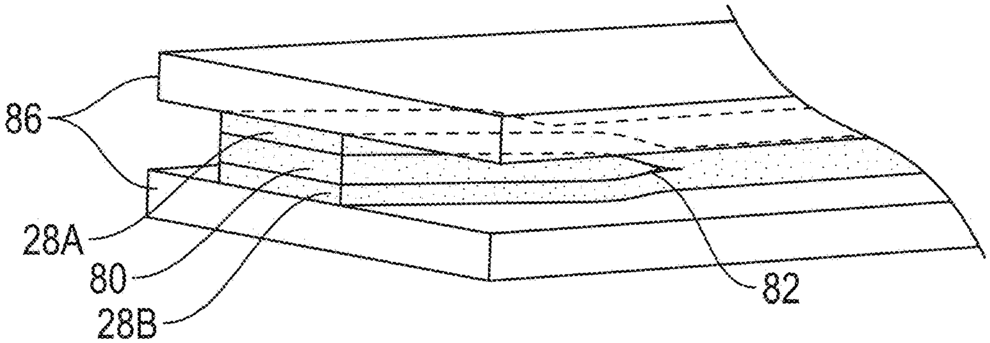
FIG. 15 is a fragmentary perspective view of the split sheet of FIG. 14 being secured to the intermediate layer in a heat press.
Figure 16:
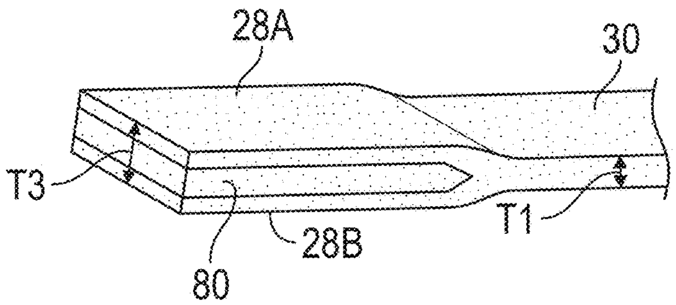
FIG. 16 is a fragmentary perspective view of the split sheet secured to the intermediate layer after heat pressing.

FIG. 15 shows the stacked outer layers 28A, 28B and intermediate layer 80 placed in a heat press 86 to provide some securement of the outer layers 28A, 28B to the intermediate layer 80 prior to thermoforming. The first outer layer 28A, the intermediate layer 80, and the second outer layer 28B are thus stacked at the first portion 28. FIG. 16 shows the stacked outer layers 28A, 28B secured to the intermediate layer 80 after removal from the heat press 86, prior to thermoforming. At this stage of the manufacturing process, the overall thickness T3 of the stacked layers at the first portion 28 is the sum of the thickness T1 of the split first portion 28 and the thickness T2 of the intermediate layer 80. As discussed herein, for example, the thickness T1 may be about 4 mm to 5 mm, and the thickness T3 may be about 28 mm. With a given range of pressures, temperatures, and time in the thermoforming mold as discussed herein, the resulting thickness of the thermoformed first portion 28 shown in FIG. 18 may also be the thickness T1.

Figure 17:
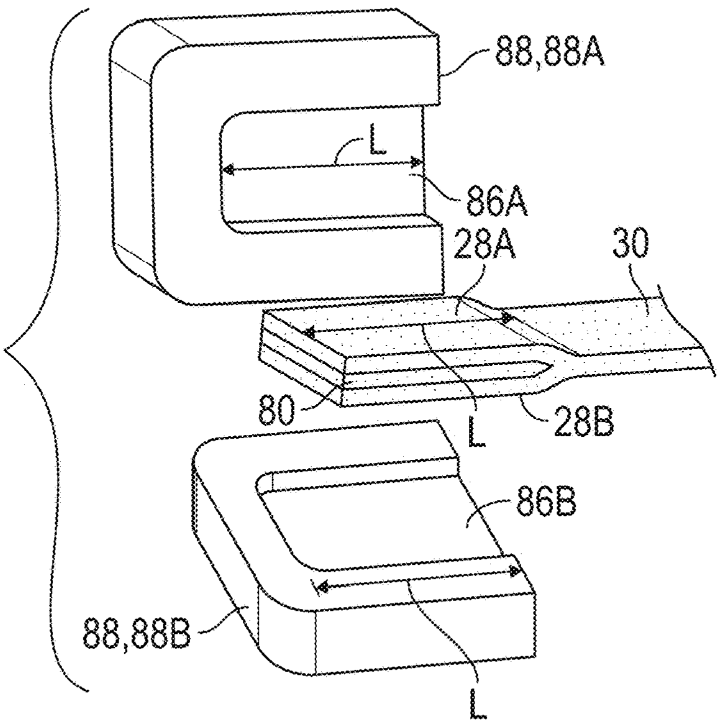
FIG. 17 is a perspective view of an open thermoforming mold for forming the male portion of the closure device of FIG. 1 and a fragmentary perspective view of the heat pressed split sheet and intermediate layer.
Figure 18:
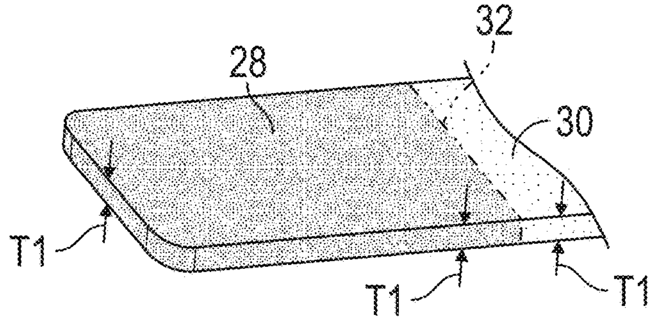
FIG. 18 is a fragmentary perspective view of the male portion of the closure device after thermoforming.

FIG. 17 shows an open thermoforming mold 88 including mold tools 88A, 88B each having a mold cavity portion 86A, 86B. For example, the mold tools 88A, 88B may be mold halves. The mold tools 88A, 88B are placed with the mold cavity portions 86A, 86B together and with the stacked layers 28A, 28B and intermediate layer 80 in the mold cavity portions 86A, 86B, and the stacked layers 28A, 28B and the intermediate layer 80 are thermoformed together and cooled, forming the first portion 28 having the same thickness T1 as the unthermoformed second portion 30, as shown in FIG. 18. Manufacturing the first portion 28 and the second portion 30 to have the same thickness may be desirable for some applications, for aesthetic reasons or otherwise. Similarly as discussed with respect to FIG. 4, the mold tools 88A, 88B may be heated, such as by resistance heating. Alternatively, instead of heating the mold tools 88A, 88B, the stacked layers 28A, 28B and the intermediate layer 80 may be heated in an oven prior to thermoforming, and the mold tools 88A, 88B, or at least the mold surfaces of the mold tools 88A, 88B, may be at room temperature or even cooled as discussed above in order to cool the exterior surface of the stacked layers 28A, 28B when placed in the mold 88 to help maintain the surface texture of the resulting thermoformed first portion 28.

Figure 19:
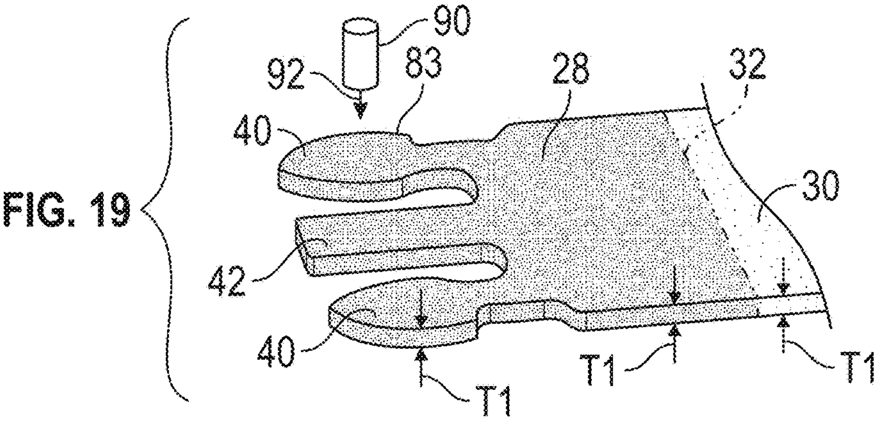
FIG. 19 is a fragmentary perspective view of the male portion of the closure device during a laser cutting process.
Figure 20:
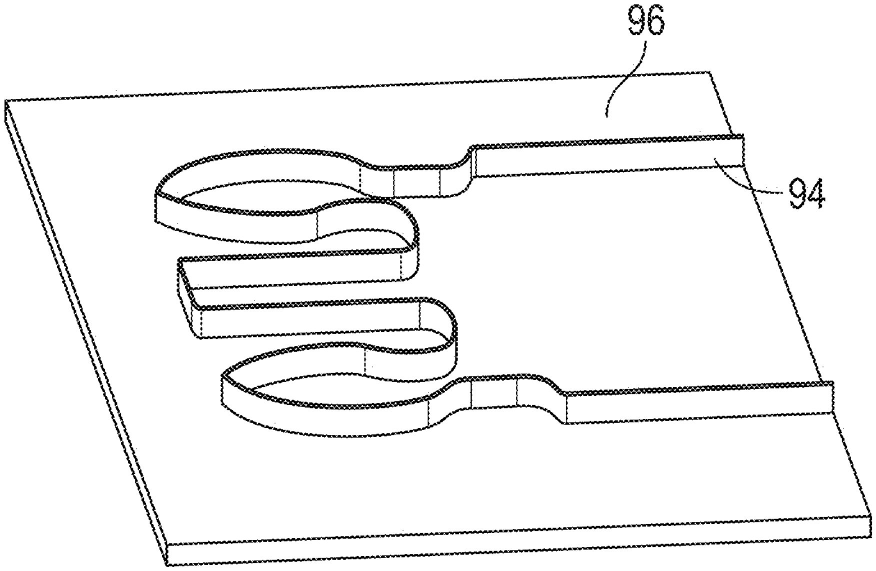
FIG. 20 is a perspective view of a punch for trimming the male portion of the closure device.

In FIG. 19, the first portion 28 is trimmed such as by laser cutting, as shown by laser 90 having a laser beam 92 directed at the first portion 28 to cut the peripheral edge 83 of the first portion 28 in the shape of the male portion 12B of the buckle 12, providing the lateral side prongs 40 and the center prong 42. The male portion 12B of the buckle 12 thus has the same thickness at both the thermoformed first portion 28 and the unthermoformed second portion 30, thus providing pleasing aesthetic features while still allowing the first portion 28 to have a first density greater than a second density of the second portion 30, and a first modulus of elasticity greater than a second modulus of elasticity of the second portion 30 so that the first portion 28 can serve as an integral implement of the nonwoven textile sheet 16, which in this case is as a male portion of a buckle. As an alternative to laser cutting shown in FIG. 19, the peripheral edge 83 of the first portion 28 could be punched such as with blades 94 of a punch 96 in the shape of the peripheral edge 83 as shown in FIG. 20.

Figure 21:
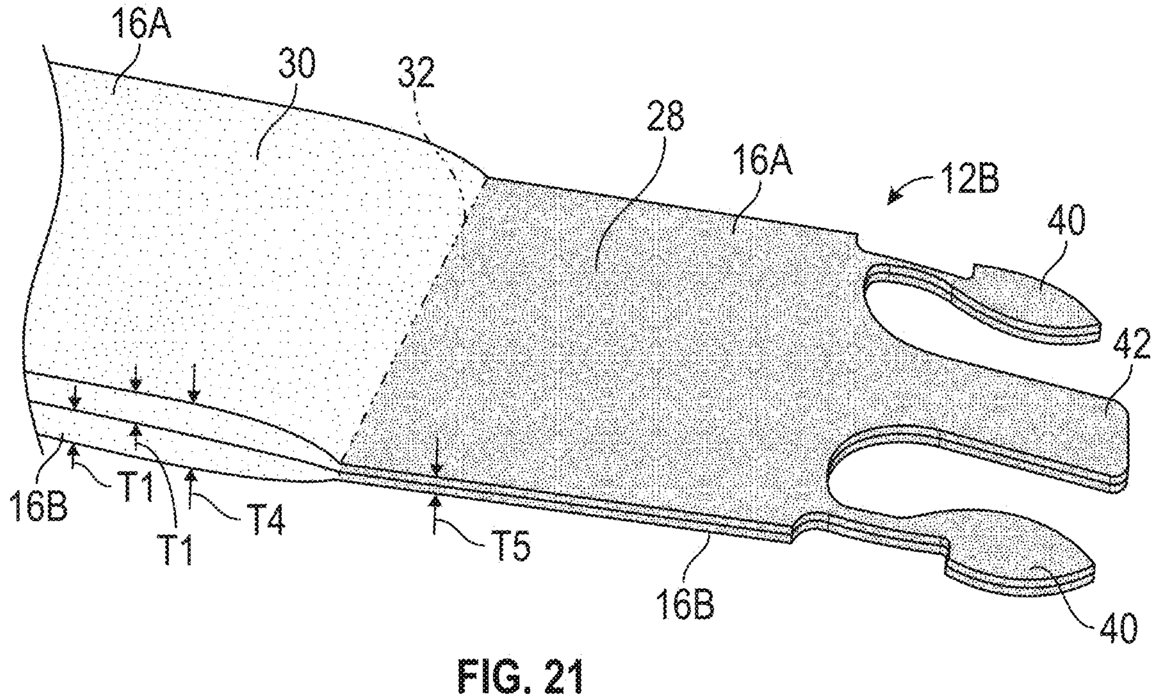
FIG. 21 is a fragmentary perspective view of an alternative male portion for the closure device of FIG. 1 in another aspect of the disclosure.

FIG. 21 shows a configuration of the male portion 12B in which two nonwoven sheets 16A and 16B are stacked together and thermoformed, without an intermediate layer between the sheets. The sheets 16A, 16B serve as a first outer layer and a second outer layer, respectively, each extending in both the first portion 28 and the second portion 30. This configuration is suitable for applications in which a difference in thicknesses of the thermoformed first portion 28 and the unthermoformed second portion 30 is desired or is at least aesthetically acceptable. The thickness T4 of the unthermoformed second section 30 may be twice the thickness T1 of the two stacked sheets 16A, 16B. The thickness of the thermoformed first portion 28 is compressed from thickness T4 to a lesser thickness T5 due to the thermoforming, causing the first portion 28 to have a first thickness T5 less than the second thickness T4 and a first modulus of elasticity greater than a second modulus of elasticity of the second portion 30.

As illustrated by FIGS. 19 and 21, the relative thicknesses of the first portion 28 and the second portion 30 may be different in different configurations. For example, a thickness of the first portion 28 may be within a range from about 10 percent less than to about 10 percent greater than a thickness of the second portion 30, or within a range from about 5 percent less than to about 5 percent greater than the thickness of the second portion, or within a range from about 1 percent less than to about 1 percent greater than the thickness of the second portion 30. Alternatively, a thickness of the first portion 28 may be more than 10 percent greater than a thickness of the second portion 30, or the thickness of the second portion 30 may be more than 10 percent greater than a thickness of the first portion 28.

Figure 22:
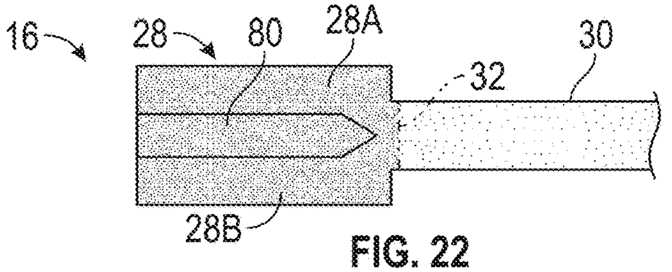
FIG. 22 is a fragmentary perspective view of an alternative male portion for the closure device of FIG. 1 in another aspect of the disclosure.
Figure 23:
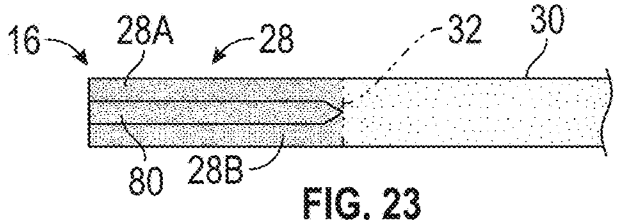
FIG. 23 is a fragmentary perspective view of an alternative male portion for the closure device of FIG. 1 in another aspect of the disclosure.
Figure 24:
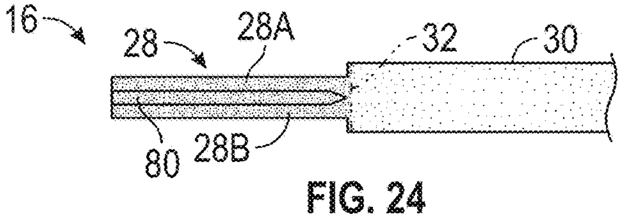
FIG. 24 is a fragmentary perspective view of an alternative male portion for the closure device of FIG. 1 in another aspect of the disclosure.

FIG. 22 shows an example of a split nonwoven textile sheet 16, similar to that described with respect to FIG. 19, except that the thermoforming mold used is configured so that, after thermoforming, the thermoformed first portion 28 is more than 10 percent thicker than the unthermoformed second portion 30. FIG. 23 shows a similar configuration except that the thermoforming mold used is configured to result in the thermoformed first portion 28 having a thickness equal to or within a range of about one percent less than to one percent greater than the thickness of the unthermoformed second portion 30. Finally, FIG. 24 shows a configuration in which the thermoforming mold is configured to result in the thermoformed first portion 28 having a thickness more than 10 percent less than the unthermoformed second portion 30.

Figure 25:
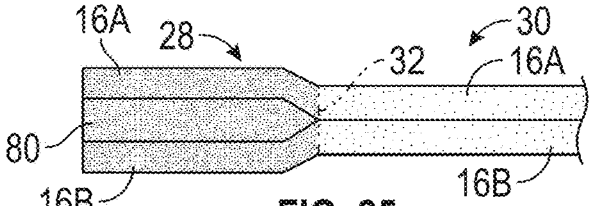
FIG. 25 is a fragmentary perspective view of an alternative male portion for the closure device of FIG. 1 in another aspect of the disclosure.
Figure 26:
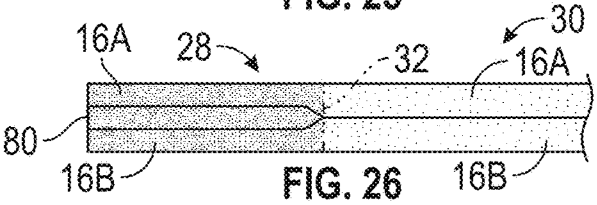
FIG. 26 is a fragmentary perspective view of an alternative male portion for the closure device of FIG. 1 in another aspect of the disclosure.
Figure 27:
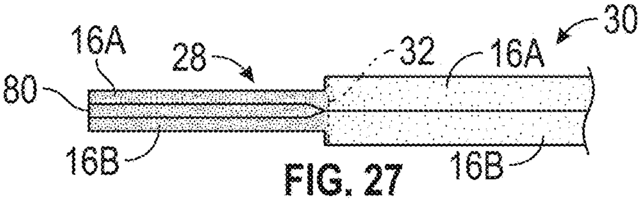
FIG. 27 is a fragmentary perspective view of an alternative male portion for the closure device of FIG. 1 in another aspect of the disclosure.

FIG. 25 shows a configuration similar to FIG. 21, in which two nonwoven textile sheets 16A, 16B are stacked, with the intermediate layer 80 extending only in the first portion 28. In the configuration of FIG. 25, the thermoforming mold is configured to result in the thickness of the first portion 28, after thermoforming, being more than 10 percent greater than the thickness of the unthermoformed second portion 30. FIG. 26 shows a similar configuration except that the thermoforming mold used is configured to result in the first portion 28 having a thickness after thermoforming equal to or within a range of about one percent less than to one percent greater than the thickness of the unthermoformed second portion 30. Finally, FIG. 27 shows a configuration in which the thermoforming mold is configured to result in the thickness of the thermoformed first portion 28 being more than 10 percent less than the thickness of the unthermoformed second portion 30.

Figure 28:
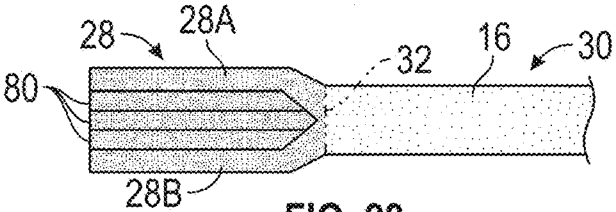
FIG. 28 is a fragmentary perspective view of an alternative male portion for the closure device of FIG. 1 in another aspect of the disclosure.

FIG. 28 shows a configuration in which multiple intermediate layers 80 are inserted into a split of the nonwoven textile sheet 16, with the split extending only in the first portion 28 so that the first portion 28 defines a first outer layer 28A and a second outer layer 28B that extend only in the first portion 28. The edges of the intermediate layers 80 are tapered so that the intermediate layers 80 abut the second portion 30 in the split without any gap after thermoforming. The middle intermediate layer 80 has both an upper bevel and a lower bevel. The uppermost intermediate layer has only a single bevel, as does the lowermost intermediate layer. The first portion 28 is shown after thermoforming, and has a thickness more than 10 percent greater than a thickness of the unthermoformed second portion 30.

Figure 29:
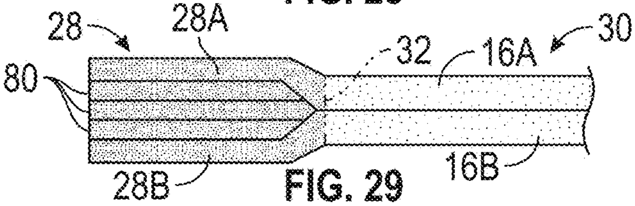
FIG. 29 is a fragmentary perspective view of an alternative male portion for the closure device of FIG. 1 in another aspect of the disclosure.

FIG. 29 shows a configuration in which multiple intermediate layers 80 are inserted between two stacked nonwoven textile sheets 16A, 16B. As in FIG. 28, the edges of the intermediate layers 80 are tapered so that there is no gap between the sheets 16A, 16B after thermoforming. The first portion 28 is shown after thermoforming, and has a thickness more than 10 percent greater than a thickness of the unthermoformed second portion 30. The thermoforming molds can be selected so that, even in configurations with multiple intermediate layers 80, the resulting thickness at the thermoformed first portion 28 can be less than the thickness of the unthermoformed second portion 30.

Figure 30:
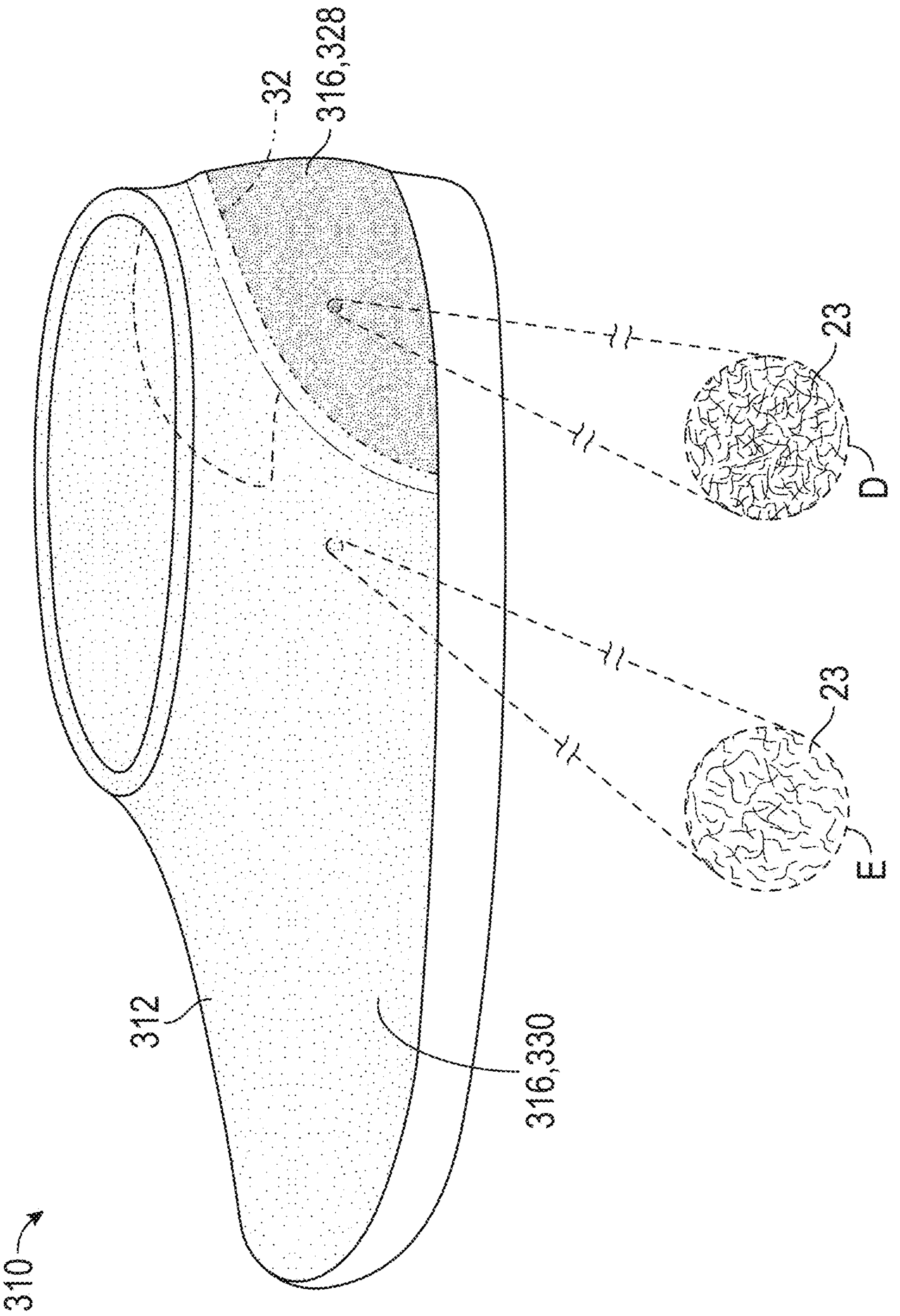
FIG. 30 is a perspective view of a wearable article that is an article of footwear having a nonwoven textile sheet that includes a heel counter in another aspect of the disclosure.

FIG. 30 shows a wearable article that is an article of footwear 310. The article of footwear 310 has an upper 312 that includes a nonwoven textile sheet 316 having a thermoformed first portion 328 shaped and dimensioned as an integral implement of the wearable article. More specifically, the first portion 328 is thermoformed to form a heel counter. An unthermoformed second portion 330 of the nonwoven textile sheet 316 is contiguous with the first portion 328 at the boundary 32. The first portion 328 has a first density and a first modulus of elasticity, and the second portion 330 has a second density less than the first density and has a second modulus of elasticity less than the first modulus of elasticity. The denser and stiffer first portion 328 enables the first portion 328 to function as an integral implement, which in this application is a heel counter. As described herein, only the first portion 328 is thermoformed, causing the fibers 23 of the nonwoven textile sheet 316 to be more densely packed than in the second portion 330, as indicated by the denser fibers 23 in the close-up circle D than in the close-up circle E.

Figure 31:
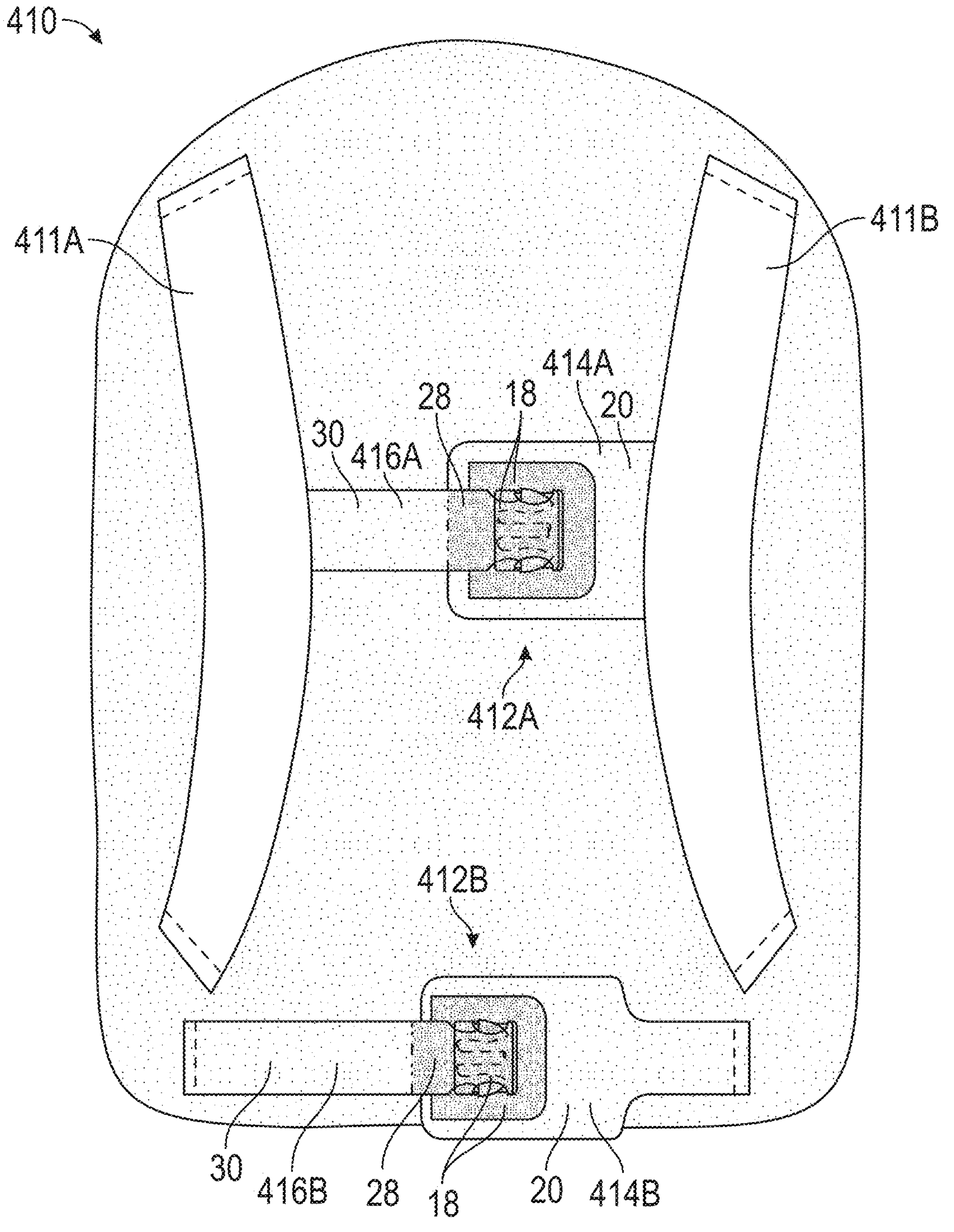
FIG. 31 is a rear view of a wearable article that is a backpack having nonwoven textile sheets that include closure devices.

FIG. 31 shows the rear side of a backpack 410 that includes two closure devices 412A, 412B within the scope of the present disclosure. For example, the backpack 410 has two shoulder straps 411A and 411B. A first closure device 412A is a buckle for a sternum strap 414A, 416A that attaches the shoulder straps 411A, 411B across the front of the body when worn. The first closure device 412A includes integral implements of the sternum strap 414A, 416A. For example, the sternum strap 414A, 416A includes a first nonwoven textile sheet 414A with a first portion 18 that is thermoformed as an integral implement that is a female portion of the closure device 412A and is as described with respect to FIG. 1. The first portion 18 has a first density and a first modulus of elasticity. The first nonwoven textile sheet 414A also includes an unthermoformed second portion 20 as described with respect to FIG. 1. The second portion 20 has a second density less than the first density, and a second modulus of elasticity less than the first modulus of elasticity.

The sternum strap 414A, 416A also includes a second nonwoven textile sheet 416A with a first portion 28 that is thermoformed as an integral implement that is a male portion of the closure device 412A and is as described with respect to FIG. 1. The first portion 28 has a first density and a first modulus of elasticity. The second nonwoven textile sheet 416A also includes an unthermoformed second portion 30 that has a second density less than the first density, and a second modulus of elasticity less than the first modulus of elasticity.

The backpack 410 also includes a second closure device 412B that is a buckle on a waist belt 414B, 416B of the backpack 410 for securing the lower part of the backpack around the waist when the backpack is worn on the body, and is configured substantially the same as the first closure device 412A. The second closure device 412B includes integral implements of the waist belt 414B, 416B. For example, the waist belt 414B, 416B includes a first nonwoven textile sheet 414B with a first portion 18 that is thermoformed as an integral implement that is a female portion of the closure device 412B and is as described with respect to FIG. 1. The first portion 18 has a first density and a first modulus of elasticity. The first nonwoven textile sheet 414B also includes an unthermoformed second portion 20 contiguous with the first portion and as described with respect to FIG. 1. The second portion 20 has a second density less than the first density, and a second modulus of elasticity less than the first modulus of elasticity. Due to the thermoforming, the density and modulus of elasticity of the first portion 18 is greater than those of the second portion 20.

The waist belt 414B, 416B also includes a second nonwoven textile sheet 416B with a first portion 28 that is thermoformed as an integral implement that is a male portion of the closure device 412B and is as described with respect to FIG. 1. The first portion 28 has a first density and a first modulus of elasticity. The second nonwoven textile sheet 416B also includes an unthermoformed second portion 30 that is contiguous with the first portion 28 and has a second density less than the first density, and a second modulus of elasticity less than the first modulus of elasticity. Due to the thermoforming, the density and modulus of elasticity of the first portion 28 is greater than those of the second portion 30.

The sternum strap 414A, 416A and the waist belt 414B, 416B may also include other components and materials, such as cushioning materials, length adjustment slides, etc. Additionally, the numerical values of the densities and moduli of elasticity of the various portions 18, 20, 28, 30 of each of the closure devices 412A, 412B may be different for each of the closure devices and may be different than those of other closure devices and integral implements disclosed herein, such as the closure device 12 of FIG. 1.

Figure 32:
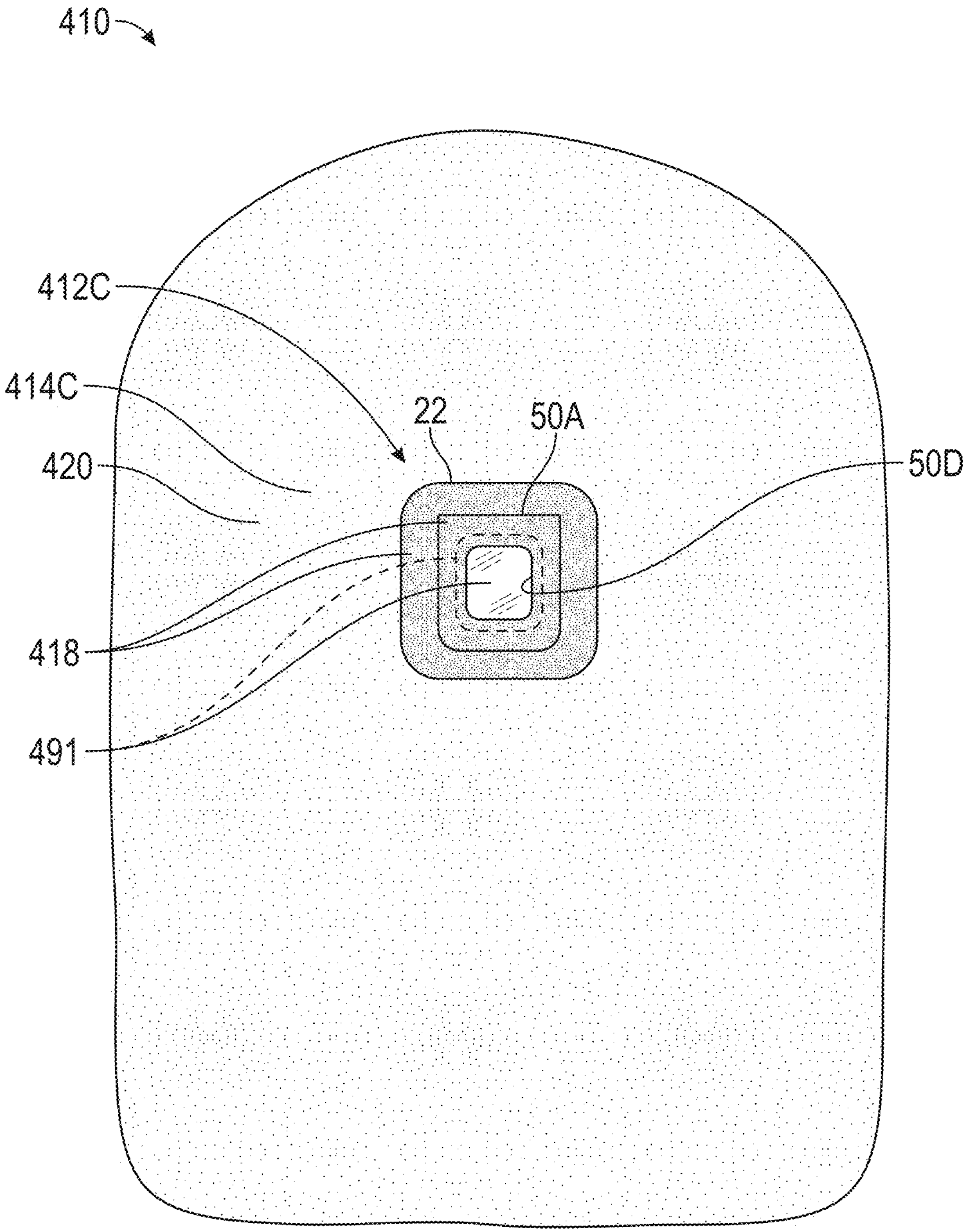
FIG. 32 is a front view of the wearable article of FIG. 31 that is a backpack having a nonwoven textile sheet that is a receptacle for a power source or a power device.

FIG. 32 is a front view of the backpack 410 of FIG. 31. The backpack includes a nonwoven textile sheet 414C that includes a first thermoformed portion 418 that is an integral implement of the sheet 414C. More specifically, the thermoformed first portion 418 is a receptacle for a power source or a power device 491, and may be referred to herein as such. In the embodiment shown, the power device 491 is a light that provides visibility to the wearer of the backpack 410. Alternatively, a power source such as a solar powered battery could be disposed in the receptacle. The nonwoven textile sheet 414C also has an unthermoformed second portion 420 that is contiguous with the first portion 418 at a boundary 22 as described herein. Due to the thermoforming, the first portion 418 has a first density and a first modulus of elasticity, and the second portion 420 has a second density less than the first density and has a second modulus of elasticity less than the first modulus of elasticity. The first portion 418 is shaped differently than the second portion 420 as an integral implement of the wearable article. The first portion 418 includes laser cut or punched through holes 50A, 50D. The through hole 50A allows insertion and withdrawal of the device 491. The through hole 50D is a window into the pocket formed by the first portion 418, and provides additional access to the power device, such as by exposing the light emitted from the power device 491. Similar to FIG. 12, nonwoven textile sheet 414C may overlay and be needle punched or otherwise secured to a textile sheet so that access to the interior of the bag is not possible through the through holes 50A, 50D, and dirt or moisture passing through the through holes does not enter the backpack 410.

Figure 33:
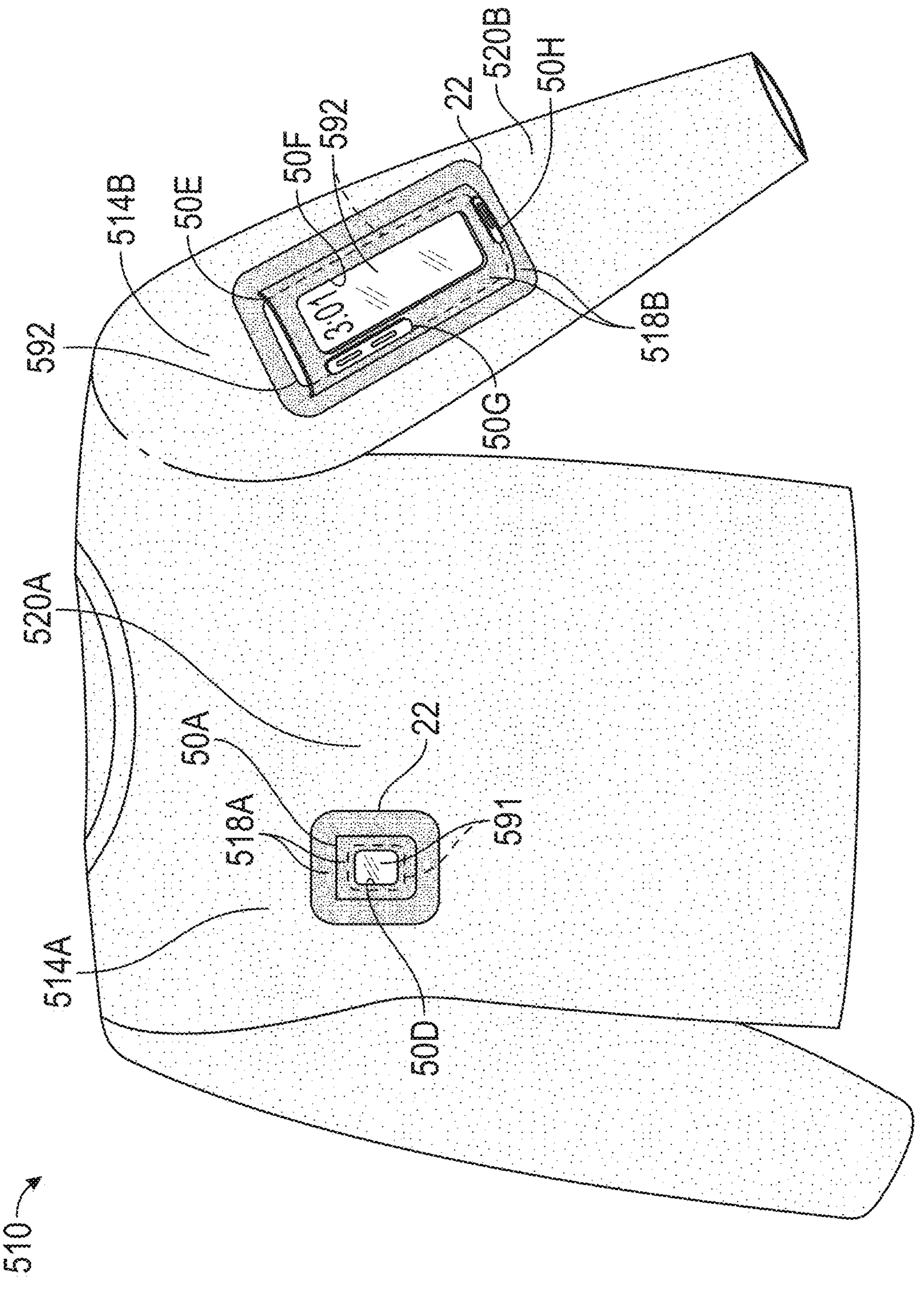
FIG. 33 is a front perspective view of a wearable article that is a shirt having nonwoven textile sheets that include receptacles for power sources and power devices.

FIG. 33 is a front perspective view of a wearable article that is a shirt 510. Although depicted as a shirt, the wearable article may instead be a vest, a jacket, a sweater, shorts, pants, or any other wearable garment. The shirt 510 includes nonwoven textile sheets 514A, 514B that include thermoformed portions 518A, 518B that are integral implements of the sheets 514A, 514B. More specifically, thermoformed first portions 518A, 518B are receptacles for power sources or power devices, and may be referred to herein as such. In the embodiment shown, the thermoformed first portion 518A is a receptacle that is similar to a pocket, and holds a power device 591 that is a light that provides visibility to the wearer of the shirt 510. Alternatively, a different power device could be disposed in the receptacle. The nonwoven textile sheet 514A also has an unthermoformed second portion 520A that is contiguous with the first portion 518A at a boundary 22 as described herein. Due to the thermoforming, the first portion 518A has a first density and a first modulus of elasticity, and the second portion 520A has a second density less than the first density and has a second modulus of elasticity less than the first modulus of elasticity. The first portion 518A is shaped differently than the second portion 520A as an integral implement of the wearable article. The first portion 518A includes laser cut or punched through holes 50A, 50D. The through hole 50A allows insertion and withdrawal of the device 591. The through hole 50D is a window into the pocket formed by the first portion 518A, and provides additional access to the power device, such as by exposing the light emitted from the power device 591. Similar to FIG. 12, nonwoven textile sheet 514A may overlay and be needle punched or otherwise secured to a textile sheet so that access to the wearer of the shirt is not possible through the through holes 50A, 50D, and dirt or moisture passing through the through holes does not contact the wearer.

In the embodiment shown, the thermoformed first portion 518B is a receptacle that is similar to a pocket, and holds a power device 592 that is depicted as a cellular phone. Alternatively, a different power device could be disposed in the receptacle. The nonwoven textile sheet 514B also has an unthermoformed second portion 520B that is contiguous with the first portion 518B at a boundary 22 as described herein. Due to the thermoforming, the first portion 518B has a first density and a first modulus of elasticity, and the second portion 520B has a second density less than the first density and has a second modulus of elasticity less than the first modulus of elasticity. The first portion 518B is shaped differently than the second portion 520B as an integral implement of the wearable article. The first portion 518B includes laser cut or punched through holes 50E, 50F, 50G, and 50H. The through hole 50E allows insertion and withdrawal of the device 592. The through hole 50F is a window into the pocket formed by the first portion 518B, and provides additional access to the power device 592B, such as by exposing a screen of the power device 592. Through holes 50G and 50H are disposed and sized for access to input features of the power device 592B, such as volume, power, and charging ports. Similar to FIG. 12, nonwoven textile sheet 514B may overlay and be needle punched or otherwise secured to a textile sheet so that access to the wearer of the shirt is not possible through the through holes 50E, 50F, 50G, and 50H, and dirt or moisture passing through the through holes does not contact the wearer.

Figure 34:
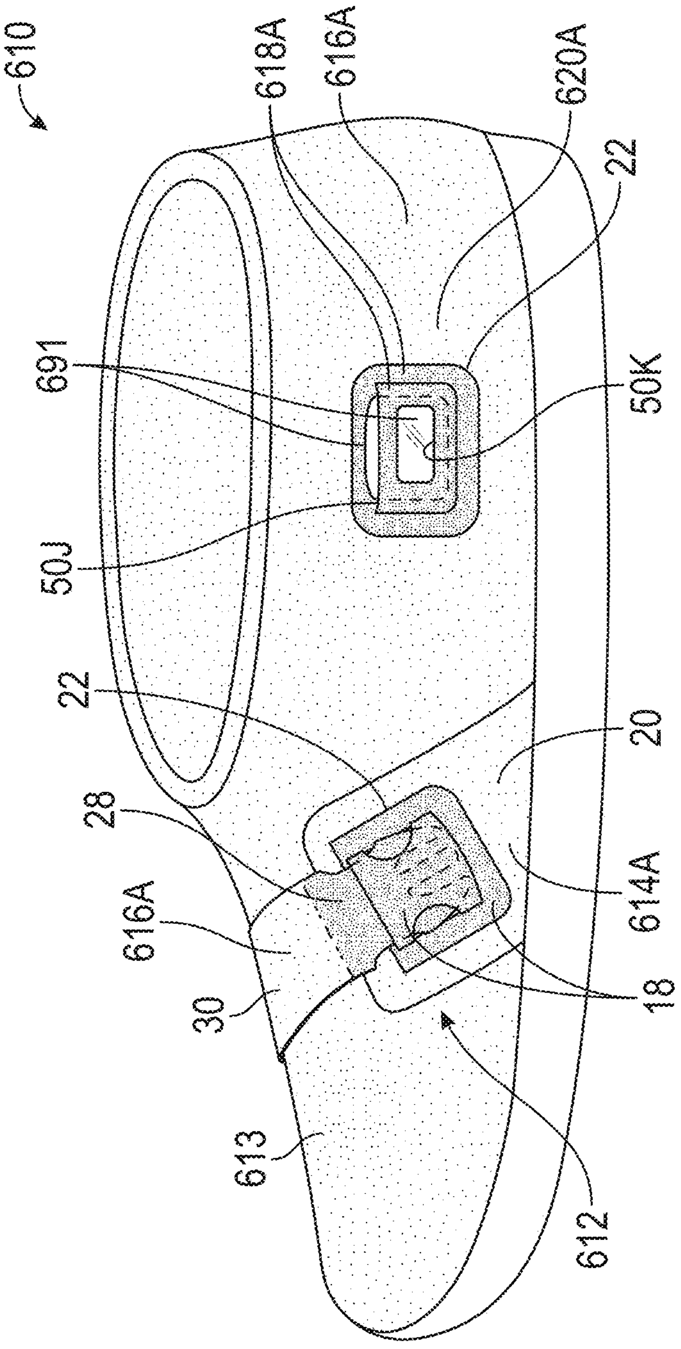
FIG. 34 is a lateral side view of a wearable article that is an article of footwear having a nonwoven textile sheet that includes a receptacle for a power source or a power device.

FIG. 34 shows a lateral side of a wearable article that is an article of footwear 610 with an upper 613 that includes a nonwoven textile sheet 616A having a thermoformed first portion 618A shaped and dimensioned as an integral implement of the wearable article. More specifically, the first portion 618A is thermoformed to form a receptacle, such as for a power source or power device 691. Alternatively, a different power device could be disposed in the receptacle. The nonwoven textile sheet 616A also has an unthermoformed second portion 620A that is contiguous with the first portion 618A at a boundary 22 as described herein. Due to the thermoforming, the first portion 618A has a first density and a first modulus of elasticity, and the second portion 620A has a second density less than the first density and has a second modulus of elasticity less than the first modulus of elasticity. The first portion 618A is shaped differently than the second portion 620A as an integral implement of the wearable article. The first portion 618A includes a laser cut or punched through holes 50J and 50K. Through hole 50J allows insertion and withdrawal of the device 691. The through hole 50K is a window into the pocket formed by the first portion 618A, and provides additional access to the power device 691, such as by exposing a light emitted by the power device 691, a screen of the power device 691, or for providing other access to the power device 691. Similar to FIG. 12, nonwoven textile sheet 616A may overlay and be needle punched or otherwise secured to a textile sheet so that access to the wearer of the article of footwear is not possible through the through holes 50J and 50K, and dirt or moisture passing through the through holes does not contact the wearer.

The article of footwear 610 also includes a closure device 612 that is a buckle for securing the upper 613 to the foot when the article of footwear is worn. The closure device 612 includes a first nonwoven textile sheet 614A with a first portion 18 that is thermoformed as an integral implement that is a female portion of the closure device 612 and is as described with respect to FIG. 1. The first portion 18 has a first density and a first modulus of elasticity. The first nonwoven textile sheet 614A also includes an unthermoformed second portion 20 as described with respect to FIG. 1. The second portion 20 has a second density less than the first density, and a second modulus of elasticity less than the first modulus of elasticity. The second portion 20 may be secured at the lateral side of the article of footwear 610.

The closure device 612 also includes a second nonwoven textile sheet 616A with a first portion 28 that is thermoformed as an integral implement that is a male portion of the closure device 612 and is as described with respect to FIG. 1. The first portion 28 has a first density and a first modulus of elasticity. The second nonwoven textile sheet 616A also includes an unthermoformed second portion 30 that has a second density less than the first density, and a second modulus of elasticity less than the first modulus of elasticity. The second portion 30 may be secured at the medial side of the article of footwear 610.

Accordingly, the wearable articles disclosed herein include nonwoven textile sheets with integral implements, providing a reduced complexity, pleasing aesthetics, and the option of using recycled materials to form the sheets. The method of manufacturing the nonwoven textile sheet disclosed herein enables different relative thicknesses of the thermoformed portion of the sheet and the unthermoformed portion to suit various applications. Various shapes of integral implements may be provided with different thermoforming molds. The integral implement of the sheet may be configured with a sufficiently high modulus of elasticity to serve the functions of the implement, while a contiguous portion of the sheet maintains a lower modulus of elasticity for comfort, aesthetic appearance, or both.

The following Clauses provide example configurations of a wearable article, and a method of manufacturing a wearable article disclosed herein.

Clause 1: A wearable article comprising: a nonwoven textile sheet having a first portion and a second portion contiguous with the first portion; wherein the first portion has a first density and a first modulus of elasticity; wherein the second portion has a second density less than the first density and has a second modulus of elasticity less than the first modulus of elasticity; and wherein the first portion is shaped differently than the second portion as an integral implement of the wearable article.

Clause 2: The wearable article of Clause 1, wherein a thickness of the first portion is within a range from about 10 percent less than to about 10 percent greater than a thickness of the second portion.

Clause 3: The wearable article of Clause 2, wherein the thickness of the first portion is within a range from about 5 percent less than to about 5 percent greater than the thickness of the second portion.

Clause 4: The wearable article of Clause 3, wherein the thickness of the first portion is within a range from about 1 percent less than to about 1 percent greater than the thickness of the second portion.

Clause 5: The wearable article of any of Clauses 1-4, wherein a thickness of the first portion is more than 10 percent greater than a thickness of the second portion.

Clause 6: The wearable article of any of Clauses 1-4, wherein a thickness of the second portion is more than 10 percent greater than a thickness of the first portion.

Clause 7: The wearable article of any of Clauses 1-6, wherein the first portion defines a through hole extending through the nonwoven textile sheet.

Clause 8: The wearable article of any of Clauses 1-7, further comprising: a textile component; wherein the nonwoven textile sheet is secured to the textile component.

Clause 9: The wearable article of any of Clauses 1-8, further comprising: a textile component; wherein fibers of the second portion of the nonwoven textile sheet are intertwined with fibers of the textile component to secure the second portion to the textile component.

Clause 10: The wearable article of Clause 9, wherein the textile component underlies both the first portion and the second portion.

Clause 11: The wearable article of any of Clauses 1-10, wherein the integral implement is one of either a female portion or a male portion of a closure device.

Clause 12: The wearable article of Clause 11, wherein the wearable article is a carry bag, a belt, or an article of footwear, and the closure device is a buckle.

Clause 13: The wearable article of Clause 12, wherein: the wearable article is a carry bag, and the integral implement is a male portion of the buckle; the carry bag includes a flap and a base; and the male portion of the buckle is disposed on a strap extending from the flap to a female portion of the buckle disposed on the base, or on a strap extending from the base to a female portion of the buckle disposed on the flap.

Clause 14: The wearable article of Clause 12, wherein: the wearable article is a carry bag, and the integral implement is a male portion of the buckle; the carry bag includes an additional nonwoven textile sheet with a first portion shaped as an integral implement that is the female portion of the buckle, and with a second portion contiguous with the first portion; wherein the first portion of the additional nonwoven textile sheet has a density greater than a density of the second portion of the additional nonwoven textile sheet and a modulus of elasticity greater than a modulus of elasticity of the second portion of the additional nonwoven textile sheet; and wherein the male portion is shaped and dimensioned to releasably secure to the female portion.

Clause 15: The wearable article of Clause 1, wherein the wearable article is footwear, and the integral implement is one of a closure device, a heel counter, or a receptacle for a power source or power device.

Clause 16: The wearable article of Clause 1, wherein the wearable article is a carry bag, an article of footwear, or an article of apparel, and the integral implement is a receptacle for a power source or a power device.

Clause 17: The wearable article of Clause 1, wherein: the first portion comprises multiple stacked nonwoven textile layers; and the multiple stacked nonwoven textile layers include a first outer layer, a second outer layer and at least one intermediate layer disposed between the first outer layer and the second outer layer.

Clause 18: The wearable article of Clause 17, wherein: an edge of the at least one intermediate layer is tapered; and the edge that is tapered is adjacent to the second portion.

Clause 19: A carry bag comprising: a nonwoven textile sheet having a first portion shaped as an integral implement that is a portion of a buckle, the nonwoven textile sheet having a second portion contiguous with the first portion; wherein the first portion has a density greater than a density of the second portion and a modulus of elasticity greater than a modulus of elasticity of the second portion.

Clause 20: The carry bag of Clause 19, wherein the portion of the buckle is a female portion of a buckle, and the carry bag further comprising: a nonwoven textile strap having a first portion shaped as an integral implement that is a male portion of the buckle that releasably secures to the female portion; wherein the nonwoven textile strap has a second portion contiguous with the first portion of the nonwoven textile strap; and wherein the first portion of the nonwoven textile strap has a density greater than a density of the second portion of the nonwoven textile strap and a modulus of elasticity greater than a modulus of elasticity of the second portion of the nonwoven textile strap.

Clause 21: A method of manufacturing a wearable article, the method comprising: thermoforming a first portion of a nonwoven textile sheet as an integral implement of the wearable article, the nonwoven textile sheet having an unthermoformed second portion contiguous with the thermoformed first portion and shaped differently than the first portion; wherein the first portion has a first density and a first modulus of elasticity after thermoforming; and wherein the unthermoformed second portion has a second density less than the first density and has a second modulus of elasticity less than the first modulus of elasticity.

Clause 22: The method of Clause 21, further comprising: prior to thermoforming the first portion, stacking multiple nonwoven textile layers to define the first portion; wherein the multiple nonwoven textile layers include a first outer layer, a second outer layer, and at least one intermediate layer disposed between the first outer layer and the second outer layer; and wherein the at least one intermediate layer extends only in the first portion.

Clause 23: The method of Clause 22, wherein the first outer layer and the second outer layer extend in both the first portion and the second portion.

Clause 24: The method of Clause 22, prior to stacking the multiple nonwoven textile layers, splitting the nonwoven textile sheet only at the first portion to define the first outer layer and the second outer layer, the first outer layer and the second outer layer extending only in the first portion.

Clause 25: The method of Clause 24, further comprising inserting the at least one intermediate layer between the first outer layer and the second outer layer.

Clause 26: The method of Clause 25, further comprising: prior to inserting the at least one intermediate layer between the first outer layer and the second outer layer, tapering an edge of the at least one intermediate layer; and wherein inserting the at least one intermediate layer between the first outer layer and the second outer layer is with the edge of the at least one intermediate layer adjacent the second portion.

Clause 27: The method of Clause 24, further comprising: after stacking the multiple nonwoven textile layers and before thermoforming the first portion, heat pressing the multiple nonwoven textile layers to one another.

Clause 28: The method of any of Clauses 21-27, further comprising: creating at least one through hole in the first portion extending through the nonwoven textile sheet.

Clause 29: The method of Clause 28, wherein creating at least one through hole in the first portion comprises laser cutting the at least one through hole or punching the at least one through hole.

Clause 30: The method of any of Clauses 21-29, further comprising: after thermoforming the first portion, trimming a peripheral edge of the first portion.

Clause 31: The method of Clause 30, wherein trimming the peripheral edge of the first portion is by laser cutting.

Clause 32: The method of any of Clauses 21-31, wherein the wearable article includes a textile component, and the method further comprising: after thermoforming the first portion, securing the nonwoven textile sheet to the textile component so that the nonwoven textile sheet extends from the textile component.

Clause 33: The method of any of Clauses 21-32, wherein the wearable article includes a textile component, and the method further comprising: after thermoforming the first portion, needle punching the second portion to the textile component.

Clause 34: The method of Clause 33, wherein, after needle punching the second portion to the textile component, the nonwoven textile sheet is adjacent to a surface of the textile component with the first portion and the second portion both overlaying the textile component at the surface, and with at least the second portion in contact with the surface.

Clause 35: The method of any of Clauses 21-34, wherein the thermoforming is in a thermoforming mold, and the method further comprising: prior to thermoforming in the thermoforming mold, heating at least the first portion of the nonwoven textile sheet; and after heating at least the first portion of the nonwoven textile sheet, placing the first portion of the nonwoven textile sheet in the thermoforming mold, wherein a temperature of a mold surface of the thermoforming mold is less than a temperature of the first portion of the nonwoven textile sheet.

To assist and clarify the description of various embodiments, various terms are defined herein. Unless otherwise indicated, the following definitions apply throughout this specification (including the claims). Additionally, all references referred to are incorporated herein in their entirety.

An "article of footwear", a "footwear article of manufacture", and "footwear" may be considered to be both a machine and a manufacture. Assembled, ready to wear footwear articles (e.g., shoes, sandals, boots, etc.), as well as discrete components of footwear articles (such as a midsole, an outsole, an upper component, etc.) prior to final assembly into ready to wear footwear articles, are considered and alternatively referred to herein in either the singular or plural as "article(s) of footwear".

"A", "an", "the", "at least one", and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. As used in the description and the accompanying claims, a value is considered to be "approximately" equal to a stated value if it is neither more than 5 percent greater than nor more than 5 percent less than the stated value. In addition, a disclosure of a range is to be understood as specifically disclosing all values and further divided ranges within the range.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

For consistency and convenience, directional adjectives may be employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the invention, as defined by the claims.

The term "longitudinal" refers to a direction extending a length of a component. For example, a longitudinal direction of a shoe extends between a forefoot region and a heel region of the shoe. The term "forward" or "anterior" is used to refer to the general direction from a heel region toward a forefoot region, and the term "rearward" or "posterior" is used to refer to the opposite direction, i.e., the direction from the forefoot region toward the heel region. In some cases, a component may be identified with a longitudinal axis as well as a forward and rearward longitudinal direction along that axis. The longitudinal direction or axis may also be referred to as an anterior-posterior direction or axis.

The term "transverse" refers to a direction extending a width of a component. For example, a transverse direction of a shoe extends between a lateral side and a medial side of the shoe. The transverse direction or axis may also be referred to as a lateral direction or axis or a mediolateral direction or axis.

The term "vertical" refers to a direction generally perpendicular to both the lateral and longitudinal directions. For example, in cases where a sole is planted flat on a ground surface, the vertical direction may extend from the ground surface upward. It will be understood that each of these directional adjectives may be applied to individual components of a sole. The term "upward" or "upwards" refers to the vertical direction pointing towards a top of the component, which may include an instep, a fastening region and/or a throat of an upper. The term "downward" or "downwards" refers to the vertical direction pointing opposite the upwards direction, toward the bottom of a component and may generally point towards the bottom of a sole structure of an article of footwear.

The terms "interior", "inner side" and "proximal" with respect to an article refer to relative portions of an article closer to the center of the article than "exterior", "outer side", and "distal" portions of the article when the article is assembled. Thus, the terms interior and exterior may be understood to provide generally opposing terms to describe relative spatial positions, as may inner side and outer side, and proximal and distal.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

While several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A wearable article comprising:

a nonwoven textile sheet having a first portion and a second portion contiguous with the first portion; and a textile component;

wherein the first portion has a first density and a first modulus of elasticity;

wherein the second portion has a second density less than the first density and has a second modulus of elasticity less than the first modulus of elasticity;

wherein fibers of the second portion of the nonwoven textile sheet are intertwined with fibers of the textile component to secure the second portion to the textile component;

wherein the second portion of the nonwoven textile sheet contacts a surface of the textile component and the first portion is displaced from the surface by a cavity between the first portion and the surface; and wherein the first portion defines a through hole extending through the nonwoven textile sheet.

2. The wearable article of claim 1, wherein the wearable article includes a needle punched area where the fibers of the second portion of the nonwoven textile sheet are intertwined with the fibers of the textile component.

3. The wearable article of claim 1, wherein the fibers of the second portion of the nonwoven textile sheet are intertwined with the fibers of the textile component along a perimeter of the second portion of the nonwoven textile sheet.

4. The wearable article of claim 1, wherein the textile component underlies both the first portion and the second portion.

5. The wearable article of claim 1, wherein the first portion is a female portion of an integral implement of the wearable article; and a male portion of the integral implement is configured to be received in the cavity through the through hole.

6. The wearable article of claim 5, wherein the integral implement is a closure device.

7. The wearable article of claim 6, wherein:

the closure device is a buckle; and the male portion hooks to the female portion at the through hole when received in the cavity.

8. The wearable article of claim 1, wherein the first portion defines a pocket and the through hole extends into the pocket.

9. The wearable article of claim 1, wherein the second portion of the nonwoven textile sheet is secured to the textile component only by the intertwined fibers.

10. The wearable article of claim 1, wherein the wearable article is an article of footwear, an article of apparel, or a carry bag.

11. A wearable article comprising:

a nonwoven textile sheet having a first portion and a second portion contiguous with the first portion;

wherein the first portion has a first density and a first modulus of elasticity;

wherein the second portion has a second density less than the first density and has a second modulus of elasticity less than the first modulus of elasticity;

wherein the first portion comprises multiple stacked nonwoven textile layers each including randomly disposed fibers;

wherein the multiple stacked nonwoven textile layers include a first nonwoven textile outer layer, a second nonwoven textile outer layer and at least one nonwoven textile intermediate layer disposed between the first nonwoven textile outer layer and the second nonwoven textile outer layer; and wherein the first portion defines a through hole extending through the nonwoven textile sheet.

12. The wearable article of claim 11, wherein:

an edge of the at least one nonwoven textile intermediate layer is tapered; and the edge that is tapered is adjacent to the second portion.

13. The wearable article of claim 12, wherein the edge that is tapered is beveled.

14. The wearable article of claim 11, wherein the wearable article is an article of footwear, an article of apparel, or a carry bag.

15. A wearable article comprising:

a nonwoven textile sheet having a first portion and a second portion contiguous with the first portion;

wherein the first portion has a first density and a first modulus of elasticity;

wherein the second portion has a second density less than the first density and has a second modulus of elasticity less than the first modulus of elasticity;

wherein the first portion comprises multiple stacked nonwoven textile layers each including randomly disposed fibers; and wherein the multiple stacked nonwoven textile layers include a first nonwoven textile outer layer, a second nonwoven textile outer layer and at least one nonwoven textile intermediate layer disposed between the first nonwoven textile outer layer and the second nonwoven textile outer layer;

wherein an edge of the at least one nonwoven textile intermediate layer is tapered, and the edge that is tapered is adjacent to the second portion; and wherein the first portion is split from a peripheral edge to the second portion to define the first nonwoven textile outer layer and the second nonwoven textile outer layer, each of the first nonwoven textile outer layer and the second nonwoven textile outer layer having an end at the peripheral edge that is remote from the second portion.

* * * * *